(12) United States Patent
Lee et al.

(10) Patent No.: US 11,604,574 B2
(45) Date of Patent: *Mar. 14, 2023

(54) ELECTRONIC DEVICE AND METHOD FOR ELECTRONIC DEVICE DISPLAYING IMAGE

(71) Applicant: Samsung Electronics Co., Ltd., Suwon-si (KR)

(72) Inventors: Woo-Yong Lee, Hwaseong-si (KR); Hye-Jin Kang, Suwon-si (KR); Jae-Yun Song, Seoul (KR); Min-Sheok Choi, Suwon-si (KR); Ki-Huk Lee, Suwon-si (KR); Cheol-Ho Cheong, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/382,904

(22) Filed: Jul. 22, 2021

(65) Prior Publication Data

US 2021/0349616 A1 Nov. 11, 2021

Related U.S. Application Data

(63) Continuation of application No. 16/498,060, filed as application No. PCT/KR2018/004489 on Apr. 18, 2018, now Pat. No. 11,073,973.

(30) Foreign Application Priority Data

Apr. 26, 2017 (KR) .................. 10-2017-0053940

(51) Int. Cl.
*H04N 5/232* (2006.01)
*H04N 5/262* (2006.01)
(Continued)

(52) U.S. Cl.
CPC .......... *G06F 3/04845* (2013.01); *G06F 3/041* (2013.01); *G06T 7/11* (2017.01);
(Continued)

(58) Field of Classification Search
CPC ......... H04N 5/23216; H04N 5/232933; H04N 5/232945; H04N 5/232127; H04N 5/2353;
(Continued)

(56) References Cited

U.S. PATENT DOCUMENTS 7,940,985 B2   5/2011  Sun et al.
7,990,429 B2   8/2011  Saito
(Continued)

FOREIGN PATENT DOCUMENTS

JP    2016-072965 A    5/2016
KR    10-0657522 B1   12/2006
(Continued)

OTHER PUBLICATIONS

Korean Office Action with English translation dated Sep. 6, 2021; Korean Appln. No. 10-2017-0053940.

*Primary Examiner* — Abdelaaziz Tissire
(74) *Attorney, Agent, or Firm* — Jefferson IP Law, LLP

(57) ABSTRACT

According to various embodiments, an electronic device may comprise: a first camera arranged on a first surface of a housing of the electronic device; a second camera arranged apart from the first camera on the first surface; a display; and a processor set to process at least a portion of a first inputted image by applying a first image effect and display same on the display, on the basis of a first object area for the first inputted image obtained by using phase difference information of the first inputted image from among the first inputted image obtained from the first camera or a second inputted image obtained from the second camera, and to process at
(Continued)

least a portion of the first inputted image by applying a second image effect and displaying same on the display, on the basis of a second object area for the first inputted image obtained by using time difference information between the first inputted image and the second inputted image.

10 Claims, 17 Drawing Sheets

(51) Int. Cl.
  *G06F 3/048* (2013.01)
  *G06T 7/50* (2017.01)
  *G06F 3/04845* (2022.01)
  *G06T 7/11* (2017.01)
  *G06T 7/90* (2017.01)
  *G06F 3/041* (2006.01)
  *H04N 5/225* (2006.01)

(52) U.S. Cl.
  CPC .................. *G06T 7/50* (2017.01); *G06T 7/90* (2017.01); *H04N 5/23212* (2013.01); *H04N 5/23216* (2013.01); *H04N 5/2621* (2013.01); *H04N 5/2258* (2013.01)

(58) Field of Classification Search
  CPC ........... H04N 5/23212; H04N 5/23219; H04N 5/235; H04N 5/23293; G06F 3/0488
  See application file for complete search history.

(56) References Cited

U.S. PATENT DOCUMENTS

| | | | |
|---|---|---|---|
| 11,073,973 B2 * | 7/2021 | Lee | ............................ G06T 7/11 |
| 2007/0008326 A1 | 1/2007 | Levien et al. | |
| 2007/0229697 A1 | 10/2007 | Choi | |
| 2008/0304740 A1 | 12/2008 | Sun et al. | |
| 2009/0160931 A1 | 6/2009 | Pockett et al. | |
| 2011/0148868 A1 * | 6/2011 | Chang | ...................... G06T 7/593 345/419 |
| 2013/0033582 A1 * | 2/2013 | Sun | ........................ H04N 13/271 348/47 |
| 2013/0088614 A1 | 4/2013 | Lee | |
| 2014/0063320 A1 | 3/2014 | Lin et al. | |
| 2014/0340486 A1 | 11/2014 | Asano | |
| 2015/0010236 A1 * | 1/2015 | Chang | ...................... G06T 5/003 382/195 |
| 2015/0042760 A1 * | 2/2015 | Chu | ....................... G06F 3/0488 348/47 |
| 2015/0187083 A1 | 7/2015 | Yoon et al. | |
| 2015/0319417 A1 | 11/2015 | Park et al. | |
| 2016/0117829 A1 | 4/2016 | Yoon et al. | |
| 2016/0125611 A1 | 5/2016 | Komatsu | |
| 2016/0127636 A1 | 5/2016 | Ito et al. | |
| 2017/0111594 A1 | 4/2017 | Ayers et al. | |
| 2017/0243617 A1 | 8/2017 | Lee et al. | |
| 2017/0318226 A1 | 11/2017 | Jung et al. | |
| 2018/0027172 A1 | 1/2018 | Akaguma | |
| 2018/0070007 A1 * | 3/2018 | Molgaard | ............... G06V 10/28 |
| 2019/0073749 A1 * | 3/2019 | Lin | .......................... G06T 5/002 |

FOREIGN PATENT DOCUMENTS

| | | |
|---|---|---|
| KR | 10-2013-0038076 A | 4/2013 |
| KR | 10-1470314 B1 | 12/2014 |
| KR | 10-2015-0077646 A | 7/2015 |
| KR | 10-2015-0126192 A | 11/2015 |
| KR | 10-2017-0123125 A | 11/2017 |
| KR | 10-1792641 B1 | 11/2017 |
| KR | 10-2251483 B1 | 5/2021 |

* cited by examiner

ELECTRONIC DEVICE AND METHOD FOR ELECTRONIC DEVICE DISPLAYING IMAGE

CROSS-REFERENCE TO RELATED APPLICATION(S)

This application is a continuation application of prior application Ser. No. 16/498,060, filed on Sep. 26, 2019, which is based on and claims priority of a National Phase Entry of PCT International Application No. PCT/KR2018/004489, which was filed on Apr. 18, 2018, and claims priority to Korean Patent Application No. 10-2017-0053940, which was filed on Apr. 26, 2017, the content of each of which are incorporated herein by reference.

TECHNICAL FIELD

The disclosure relates to an electronic device, and more particularly, to an electronic device and a method for displaying an image in an electronic device, in which an image effect is applied to an image obtained through a camera of the electronic device and the image effect-applied image is displayed.

BACKGROUND ART

Due to the widespread popularity of digital cameras, digital cameras have been recognized as electronic devices in everyday use. In addition, various electronic devices such as not only the digital cameras, but also cellular phones, smartphones, etc., include cameras, and the public as well as experts increasingly use the cameras.

Consequently, it has been essential for recent electronic devices to implement performance of image and data communication at high speed, especially, to have digital camera functions using an imaging module, as well as to perform voice communication.

Among the digital camera functions used in the electronic device, functions required for basic photographing, storage, and transmission have been simply used initially, but to meet various demands of users, techniques for improving performance, quality, and functions have been developed. In particular, research has been carried out on a technique for applying various image effects to a captured image.

DETAILED DESCRIPTION OF THE INVENTION

Technical Problem

To apply various effects to a captured image, not only a high-resolution image, but also various information related to the image is required. To this end, an electronic device having a camera function obtains meta information related to an image (e.g., a preview image, a still image, or a moving image) while displaying the image by using one image sensor and captures the image according to a capturing command of a user, thus obtaining the image and the meta information related to the image together.

As such, when the image and the meta information (e.g., depth information) related to the image by using one image sensor are obtained together, the meta information related to the image is first obtained and then the image is obtained, or the image is first obtained and then the meta information related to the image is obtained, resulting in a time difference between when the meta information related to the image is obtained and when the image is actually obtained.

In particular, when the depth information (also called 'distance information') related to the image and the image are obtained together, it is impossible to simultaneously obtain high-resolution distance information and the high-resolution image without a time difference by using one imaging module. The imaging module uses optics of high modulation transfer function (MTF) characteristics to obtain the high-resolution image, in which as the MTF increases, a depth of field (DoF) of the optics is reduced, and to increase the reduced DoF, a lens has to be moved, needing some time. The image and the meta information related to the image may not be obtained at the same time, such that the electronic device may not provide an image effect using the obtained image in real time.

According to various embodiments of the disclosure, there are provided an electronic device and a method for displaying an image in the electronic device, in which an image effect is applied in real time to an image obtained using an image sensor capable of simultaneously obtaining the image and meta information related to the image, and the image effect-applied image is displayed.

According to various embodiments of the disclosure, there are provided an electronic device and a method for displaying an image in the electronic device, in which the image effect-applied image is provided to a user based on low-depth meta information, while obtaining precise meta information related to the image using dual cameras to apply the image effect to the image.

Technical Solution

According to various embodiments of the disclosure, an electronic device includes a first camera arranged on a first surface of a housing of the electronic device, a second camera arranged spaced apart from the first camera on the first surface, a display, and a processor configured to apply a first image effect to at least a part of a first input image that is obtained from the first camera, based on a first object area for the first input image, the first object area being obtained using phase difference information of the first input image between the first input image and a second input image obtained from the second camera, and display the first image effect-applied first input image on the display and to apply a second image effect to at least a part of the first input image based on a second object area for the first input image, the second object area being obtained using disparity information between the first input image and the second input image, and display the second image effect-applied first input image on the display.

According to various embodiments of the disclosure, a method for displaying an image in an electronic device includes applying a first image effect to at least a part of a first input image that is obtained from a first camera arranged on a first surface of a housing of the electronic device, based on a first object area for the first input image, the first object area being obtained using phase difference information of the first input image between the first input image and a second input image obtained from a second camera arranged spaced apart from the first camera on the first surface, and displaying the first image effect-applied first input image, and applying a second image effect to at least a part of the first input image based on a second object area for the first input image, the second object area being obtained using disparity information between the first input image and the second input image, and displaying the second image effect-applied first input image.

According to various embodiments of the disclosure, a computer-readable recording medium has recorded thereon a program to be executed on a computer, the program including executable instructions that cause, when executed by a processor, the processor to perform operations of applying a first image effect to at least a part of a first input image that is obtained from a first camera arranged on a first surface of a housing of the electronic device, based on a first object area for the first input image, the first object area being obtained using phase difference information of the first input image between the first input image and a second input image obtained from a second camera arranged spaced apart from the first camera on the first surface, and displaying the first image effect-applied first input image, and applying a second image effect to at least a part of the first input image based on a second object area for the first input image, the second object area being obtained using disparity information between the first input image and the second input image, and displaying the second image effect-applied first input image.

Advantageous Effects

According to various embodiments of the disclosure, by sequentially or continuously in real time providing images to which low-depth image effects are applied and high-depth image effects are applied based on various meta information obtained from at least one of a first camera or a second camera, user convenience may be improved.

MODE FOR CARRYING OUT THE INVENTION

Figure 1:
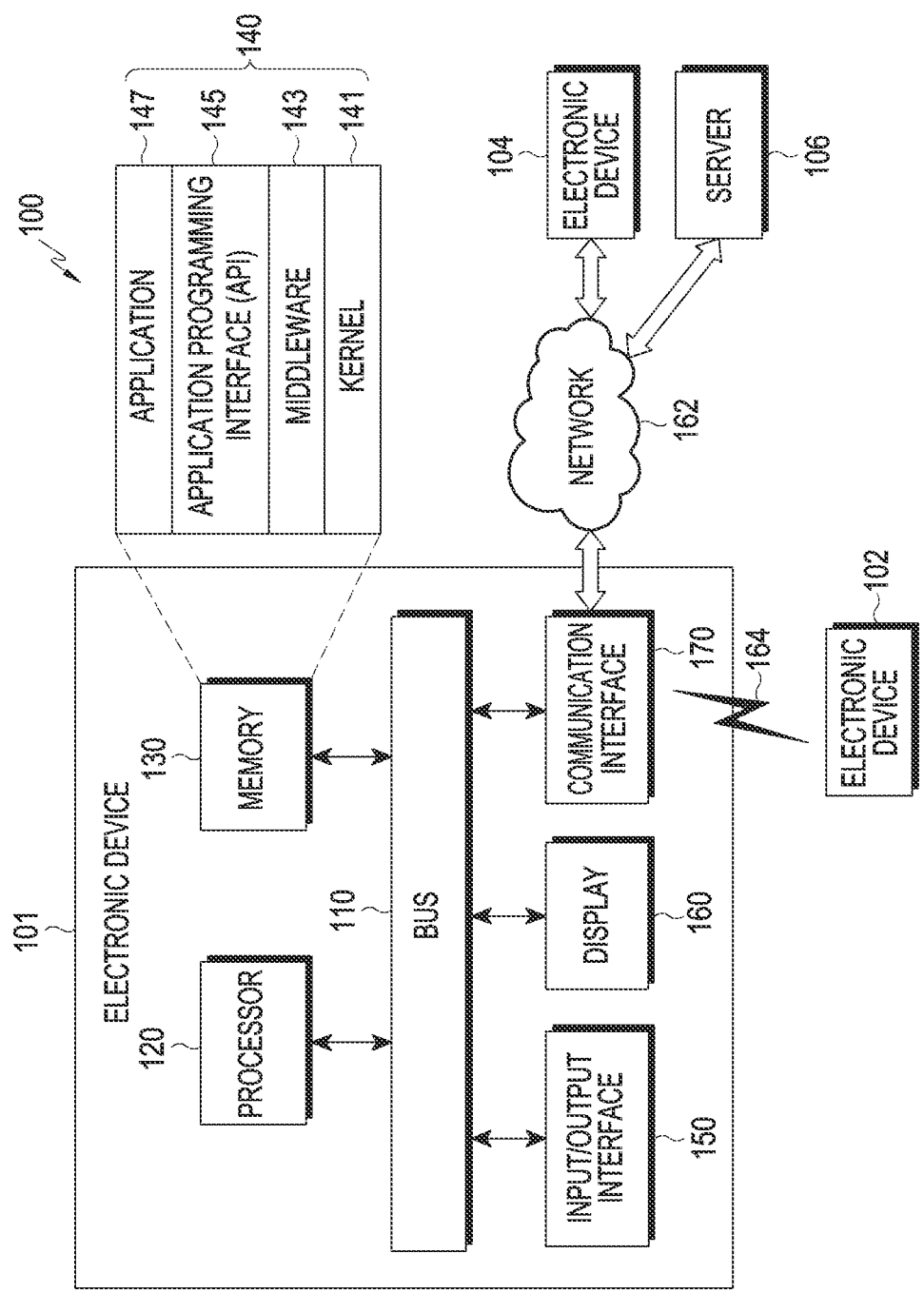
FIG. 1 illustrates an electronic device in a network environment according to various embodiments of the disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, or a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implantable circuit, or the like. In some embodiments, the electronic device may include, for example, at least one of a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a media box (e.g., Samsung HomeSync™, Apple TV™, or Google TV™), a game console (e.g., Xbox™ or PlayStation™), an electronic dictionary, an electronic key, a camcorder, or an electronic frame.

In other embodiments, the electronic device may include at least one of various medical equipment (e.g., various portable medical measurement devices (a blood glucose meter, a heart rate measuring device, a blood pressure measuring device, a body temperature measuring device, etc.), magnetic resonance angiography (MRA), magnetic resonance imaging (MRI), computed tomography (CT), an imaging device, or an ultrasonic device), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), or an Internet of things device (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of furniture, a building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device (e.g., an artificial intelligence electronic device).

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements.

The bus 110 may include a circuit for connecting, e.g., the elements 110 to 170 and delivering communication (e.g., a control message or data) between the elements 110 to 170.

The processor 120 may include one or more of a central processing unit (CPU), an application processor (AP), and a communication processor (CP). The processor 120 may perform operations or data processing for control or communication of, for example, at least one other elements of the electronic device 101.

The memory 130 may include a volatile or nonvolatile memory. The memory 130 may store, for example, instructions or data associated with at least one other elements of the electronic device 101. According to an embodiment, the memory 130 may store software or a program 140. The program 140 may include at least one of, for example, a kernel 141, middleware 143, an application programming interface (API) 145, or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, a symbol, etc.) to users. The display 160 may include a touchscreen and receive a touch, a gesture, proximity, or a hovering input, for example, by using an electronic pen or a body part of a user. The communication interface 170 establishes communication between the electronic device 101 and an external device (e.g., the vehicle device 102, the electronic device 104, or the server 106). For example, the communication interface 170 may be connected to a network 162 through a wireless communication or wired communication to communicate with an external device (e.g., the second external electronic device 104 or the server 106).

The wireless communication may include cellular communication using at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). According to an embodiment, the wireless communication may include at least one of Wireless Fidelity (WiFi), light fidelity (LiFi), Bluetooth, Bluetooth Low Energy (BLE), Zigbee, near field communication (NFC), magnetic secure transmission (MST), radio frequency (RF), or a body area network (BAN), as illustrated as an element 164 in FIG. 1. According to an embodiment, the wireless communication may include a global navigation satellite system (GNSS). The GNSS may include, for example, at least one of a global positioning system (GPS), a global navigation satellite system (Glonass), a Beidou navigation satellite system ("Beidou"), or Galileo, the European global satellite-based navigation system. Hereinbelow, "GPS" may be used interchangeably with "GNSS". The wired communication may include, for example, at least one of a universal serial bus (USB), a high definition multimedia interface (HDMI), Recommended Standard 232 (RS-232), power line communication, a plain old telephone service (POTS), or the like. The network 162 may include a telecommunications network, for example, at least one of a computer network (e.g., a local area network (LAN) or a wide area network (WAN)), Internet, or a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102,104 or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101.

According to an embodiment of the disclosure, the server 106 may obtain an input image from at least one camera. For example, the server 106 may obtain a first input image from a first camera (not shown) and a second input image from a second camera (not shown). The server 106 may store the image obtained using the first input image and the second input image in the memory 130. The server 106 may transmit the first input image, the second input image, or the image obtained using the first input image and the second input image to the electronic device 101 at the request of the electronic device 101.

According to an embodiment of the disclosure, the server 106 may obtain an area to which an image effect is to be applied, based on at least one of the first input image or the second input image. For example, the server 106 may obtain a first area to which the image effect is to be applied, based on phase difference information of the first input image. The server 106 may obtain a second area to which the image effect is to be applied, based on phase difference information of the second input image. The server 106 may obtain a third area to which the image effect is to be applied, by using the phase difference information of the first input image and the phase difference information of the second input image. The server 106 may transmit at least one of the first area, the second area, or the third area to the electronic device 101 at the request of the electronic device 101. The electronic device 101 may receive the first input image, the second input image, and an area (e.g., at least one of a first area, a second area, or a third area) of the first input image (or the second input image) to which an image effect is to be applied, apply the image effect to the area in the first input image (or the second input image) to which the image effect is to be applied, and display the image-effect applied image. According to an embodiment of the disclosure, the image effect may include at least one of an out-focusing effect, a blurring effect, or a bokeh effect. The image effect may further include a color filter effect that is set differently for each area.

The electronic device 101 may then process or further process the received result to provide the requested function or service. To that end, a cloud computing, distributed computing, or client-server computing technology may be used, for example.

Figure 2:
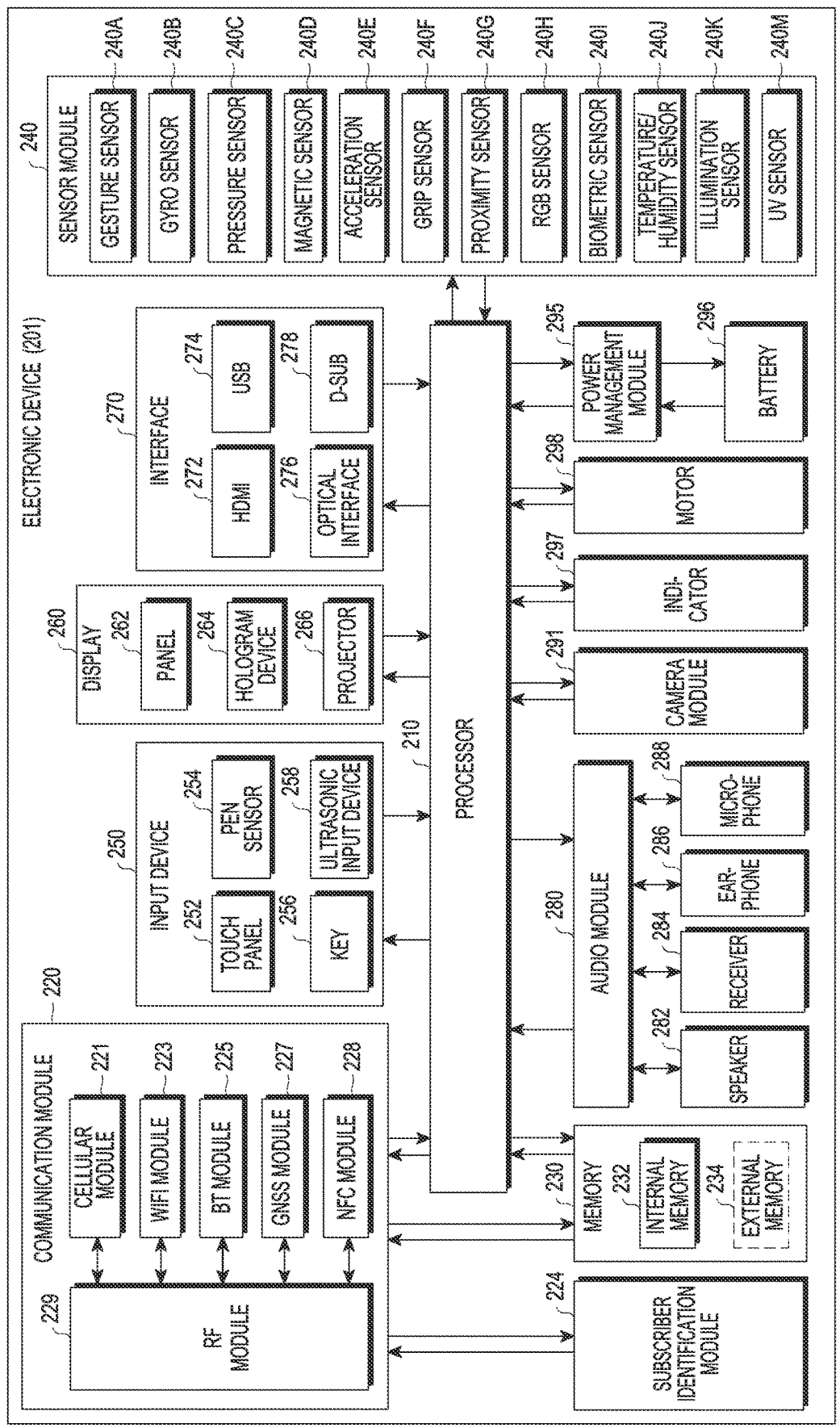
FIG. 2 is a block diagram of an electronic device according to various embodiments of the disclosure.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an operating system (OS) or an application program, and performs processing and operations with respect to various data. The processor 210 may be implemented with, for example, a system on chip (SoC). According to an embodiment of the present disclosure, the server 210 may include a graphic processing unit (GPU) or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface 170. The communication module 220 may include, for example, the cellular module 221, a WiFi module 223, a Bluetooth (BT) module 225, a GNSS module 227, an NFC module 228, and a radio frequency (RF) module 229. The cellular module 221 may provide, for example, a voice call, a video call, a text service, or an Internet service over a communication network. According to an embodiment of the present disclosure, the cellular module 221 may identify and authenticate the electronic device 201 in a communication network by using the SIM 224 (e.g., a SIM card). According to an embodiment of the present disclosure, the cellular module 221 may perform at least one of functions that may be provided by the processor 210. According to an embodiment of the present disclosure, the cellular module 221 may include a communication processor (CP). According to an embodiment of the present disclosure, at least some (e.g., two or more) of the cellular module 221, the WiFi module 223, the BT module 225, the GNSS module 227, or the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment of the present disclosure, at least one of the cellular module 221, the WiFi module 223, the BT module 225, the GNSS module 227, or the NFC module 228 may transmit and receive an RF signal through the separate RF module. The SIM 224 may, for example, include a card including a SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, or a solid state drive (SSD). The external memory 23b may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, or an ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, or a fingerprint sensor. The sensor module 240 may further include a control circuit for controlling at least one sensor included therein. In some embodiment of the disclosure, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, or a control circuit for controlling them. The panel 262 may be implemented to be flexible, transparent, or wearable. The panel 262 may be configured with the touch panel 252 in one module. According to an embodiment of the present disclosure, the panel 262 may include a pressure sensor (or a "force sensor") capable of measuring a strength of a pressure by a user's touch. The pressure sensor may be implemented integrally with the touch panel 252 or may be implemented as one or more sensors separate from the touch panel 252. The hologram device 264 may show a stereoscopic image in the air by using interference of light. The projector 266 may display an image onto a screen through projection of light.

The screen may be positioned inside or outside the electronic device 201. According to an embodiment, the interface 270 may include a high-definition multimedia interface (HDMI) 272, a universal serial bus (USB) 274, an optical communication 276, or a D-subminiature 278. The interface 270 may be included in the communication interface 170 illustrated in FIG. 1. Additionally or alternatively, the interface 270 may include, for example, an MHL interface, an SD card/MMC interface, or an infrared data association (IrDA) interface.

The audio module 280 may bi-directionally convert sound and an electric signal. At least one element of the audio module 280 may be included in the I/O interface 145 illustrated in FIG. 1. The audio module 280 may process sound information input or output through the speaker 282, the receiver 284, the earphone 286, or the microphone 288. The camera module 291 may be, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 295 may manage power of the electronic device 201. According to an embodiment of the present disclosure, the power management module 295 may include a power management integrated circuit (PMIC), a charger IC, or a battery fuel gauge. The PMIC may have a wired or wireless charging scheme. The wireless charging scheme may further include a magnetic-resonance type, a magnetic induction type, and an electromagnetic type, and may further include an additional circuit for wireless charging, for example, a coil loop, a resonance circuit, a rectifier, etc. The battery gauge may measure the remaining capacity of the battery 296 or the voltage, current, or temperature of the battery 296 during charging. The battery 296 may include, for example, a rechargeable battery or a solar battery.

The indicator 297 displays a particular state, for example, a booting state, a message state, or a charging state, of the electronic device 201 or a part thereof (e.g., the processor 210). The motor 298 may convert an electric signal into mechanical vibration or generate vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments of the present disclosure, some components of the electronic device (e.g., the electronic device 201) may be omitted or may further include other elements, and some of the components may be coupled to form one entity and identically perform functions of the components before being coupled.

Figure 3:
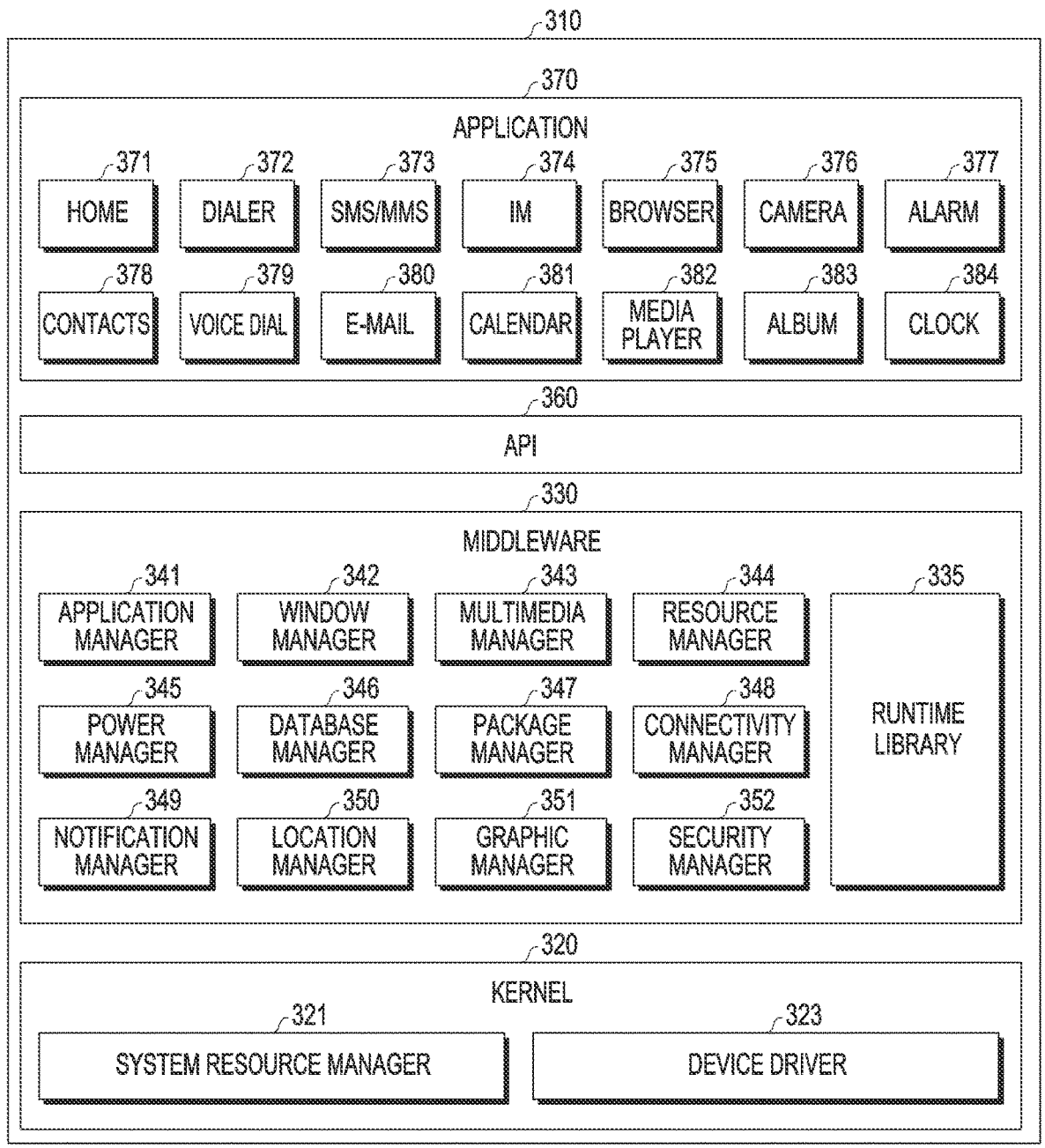
FIG. 3 is a block diagram of a programming module according to various embodiments of the disclosure.

FIG. 3 is a block diagram of a programming module according to various embodiments of the present disclosure. According to an embodiment of the present disclosure, a programming module 310 (e.g., the program 140) may include an OS for controlling resources associated with an electronic device (e.g., the electronic device 101) or various applications (e.g., the application program 147) executed on the OS. The OS may include Android™, iOS™, Windows™, Symbian™, Tizen™, or Bada™. Referring to FIG. 3, the programming module 310 may include a kernel 320 (e.g., the kernel 141), middleware 330 (e.g., the middleware 143), an application programming interface (API) 360 (e.g., the API 145), or an application 370 (e.g., the application program 147). At least a part of the programming module 310 may be preloaded on an electronic device or may be downloaded from an external device (e.g., the electronic device 102 or 104, or the server 106).

The kernel 320 may include a system resource manager 321 or a device driver 323. The system resource manager 321 may perform control, allocation, retrieval of system resources, and so forth. According to an embodiment of the present disclosure, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module that a compiler uses to add a new function through a programming language while the application 370 is executed. The runtime library 335 performs input/output management, memory management, or calculation function processing. The application manager 341 may manage a life cycle of the applications 370. The window manager 342 may manage a graphic user interface (GUI) resource used in a screen. The multimedia manager 343 may recognize a format necessary for playing media files and perform encoding or decoding on a media file by using a codec appropriate for a corresponding format. The resource manager 344 may manage a source code or a memory space of the applications 370. The power manager 345 may manage, for example, a capacity, a temperature, or power of a battery and determine or provide power information necessary for an operation of the electronic device using corresponding information. According to an embodiment, the power manager 345 may operate with a basic input/output system (BIOS). The database manager 346 may generate, search or change a database used for at least one application among the applications 370. The package manager 347 may manage the installation or update of an application distributed in a package file format.

The connectivity manager 348 may manage a wireless connection. The notification manager 349 may provide an event, e.g., an arriving message, an appointment, proximity notification, etc. The location manager 350 may manage location information about an electronic device. The graphic manager 351 may manage, for example, a graphic effect to be provided to a user or a user interface relating thereto. The security manager 352 may provide, for example, system security or user authentication. According to an embodiment of the present disclosure, the middleware 330 may further include a telephony manager for managing a voice or video call function of the electronic device or a middleware module forming a combination of functions of the above-described components. According to an embodiment of the present disclosure, the middleware 330 may provide a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed. At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions. The computer-readable recording medium includes hard disk, floppy disk, or magnetic media (e.g., a magnetic tape), optical media (e.g., compact disc read only memory (CD-ROM) or digital versatile disc (DVD)), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

Figure 4A:
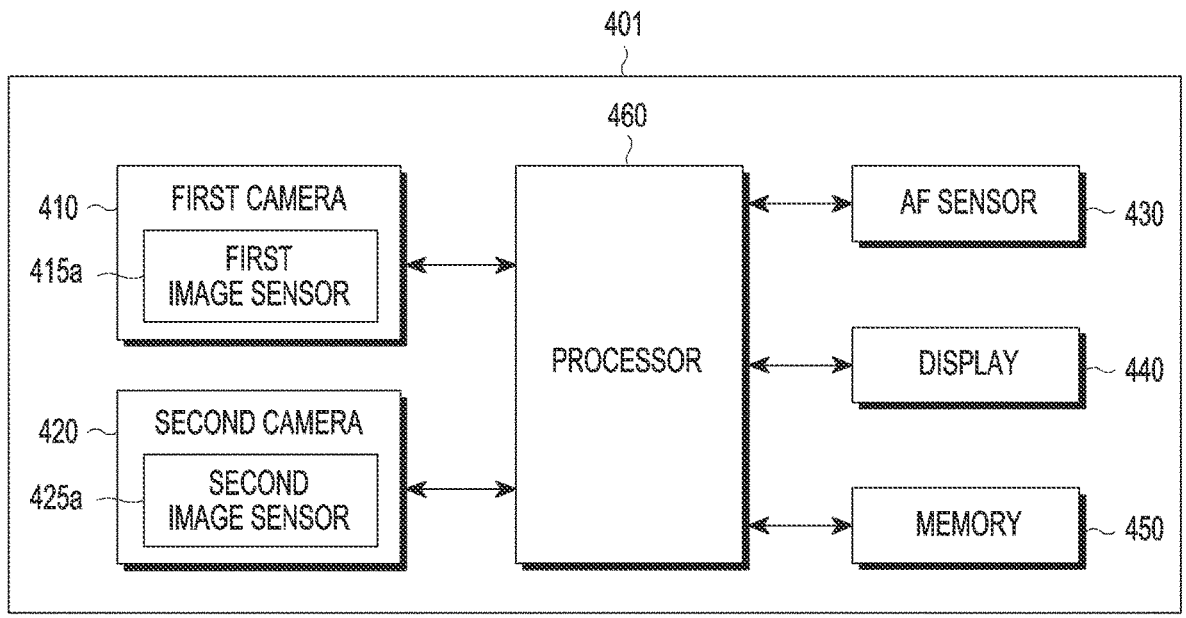
FIGS. 4A and 4B are block diagrams of an electronic device according to various embodiments of the disclosure.
Figure 4B:
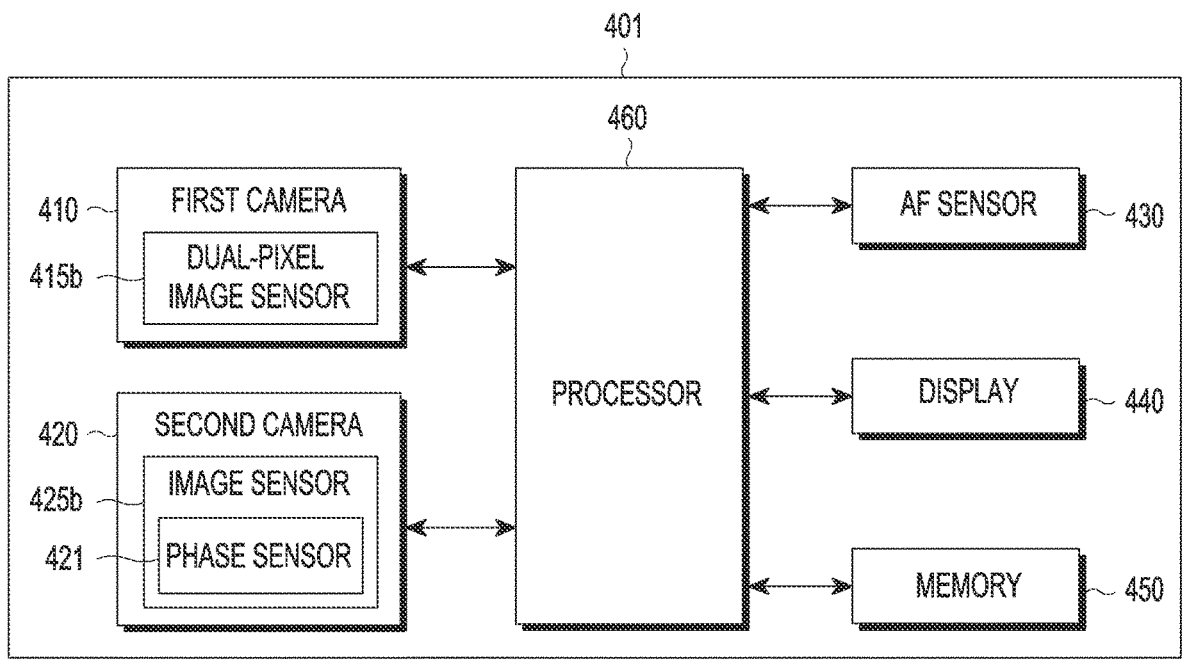

FIGS. 4A and 4B are block diagrams of an electronic device according to various embodiments of the present disclosure.

Referring to FIGS. 4A and 4B, an electronic device 401 may include at least one of a first camera 410, a second camera 420, an auto focus (AF) sensor 430, a display 440, a memory 450, or a processor 460. In FIGS. 4A and 4B, the same components are illustrated except for different structures of the image sensor of the first camera 410 or the second camera 420, such that the components of FIG. 4B that are the same as those of FIG. 4A will not be described. FIGS. 4A and 4B illustrate only components related with various embodiments of the disclosure, and may also include other components than the foregoing or illustrated components. For example, the electronic device 401 of FIGS. 4A and 4B may include the entire electronic device 101 illustrated in FIG. 1 or the electronic device 201 illustrated in FIG. 2, or a part of the electronic device 101 or 201.

The electronic device 401 is an electronic device including dual cameras that may include a first camera 410 located on a front surface of a housing (not shown) of the electronic device 401 and a second camera 420 located spaced apart from the first camera 410 on the first surface.

According to an embodiment of the disclosure, the first camera 410 and the second camera 420 may be of the same type.

According to an embodiment of the disclosure, the first camera 410 and the second camera 420 may be of different types. For example, the first camera 410 may be a wide camera, and the second camera 420 may be a tele camera. For example, the first camera 410 may be a red/green/blue (RGB) camera, and the second camera 420 may be a mono camera. The first camera 410 and the second camera 420 may include first and second image sensors 415a and 425a illustrated in FIG. 4A, respectively. The image sensors 415a and 425a are examples of an electronic sensor, and upon incidence of light reflected from an object through a lens, the image sensors 415a and 425a may sense the incident light and output an electrical image signal corresponding to the sensed light. The image sensors 415a and 425a may output an image signal of the photographed object in the unit of a frame.

According to an embodiment of the disclosure, the first image sensor 415a may obtain the first input image by outputting first image signals that are electrical signals into which light reflected from the object and input to the first camera 410 is converted, and the second image sensor 425a may obtain the second input image by outputting second image signals that are electrical signals into which light reflected from the object and input to the second camera 420 is converted. The processor 460 may display the first input image or the second input image in real time in the form of a preview image, a still image, or a moving image on the display 440. The processor 460 may store the first input image or the second input image in the memory 450, and display the stored first input image or the stored second input image on the display 440. The processor 460 may obtain the first input image or the second input image in the form of a preview image or a moving image displayed on the display 440 as a still image and store the obtained still image in the memory 450.

According to an embodiment of the disclosure, the processor 460 may use, for example, one of the first camera 410 and the second camera 420 as a left-eye camera and use the other as a right-eye camera to generate one combined image based on the first image signal obtained from the first camera 410 and the second image signal obtained from the second camera 420. The processor 460 may display in real time the combined image in the form of a preview image, a still image, or a moving image on the display 440 or obtain the combined image as a still image, and store the combined image in the memory 450.

According to an embodiment of the disclosure, the processor 460 may receive the first input image or the second input image from a server (e.g., the server 106). For example, the server 106 may obtain the first input image from a first camera (not shown) of the server 106 and the second input image from a second camera (not shown) of the server 106. The server 106 may combine the first input image with the second input image to generate one combined image. The server 106 may transmit the first input image or the second input image to the electronic device 401 at the request of the electronic device 401. The server 106 may transmit the combined image to the electronic device 401. Thus, the processor 460 may receive the first input image or the second input image transmitted from the server 106. The processor 460 may receive the combined image transmitted from the server 106.

According to an embodiment of the disclosure, the image sensors 415a and 415b may include at least one of, for example, a complementary metal-oxide-semiconductor (CMOS) sensor, a charge coupled diode (CCD) sensor, a Foveon sensor, or a complementary image sensor.

According to an embodiment of the disclosure, at least one of the first camera 410 or the second camera 420 may include the dual-pixel image sensor 415b or an image sensor 425b including the phase sensor 421 as illustrated in FIG. 4B.

According to an embodiment of the disclosure, in the dual-pixel image sensor 415b, each pixel may correspond to a pair of a first sub-pixel and a second sub-pixel. The processor 460 may obtain phase signals indicating phase differences between first signals and second signals respectively detected from the first sub-pixels and the second sub-pixels in the dual-pixel image sensor 415b. The image sensor 425b including the phase sensor 421 may include at least one phase sensor 421 capable of detecting in positions corresponding to some pixels among all pixels included in the image sensor 425b, a phase signal corresponding to the corresponding pixels. The dual-pixel image sensor 415b or the image sensor 425b including the phase sensor 421 may simultaneously detect an image signal and a phase signal.

Although it is illustrated in FIG. 4B that the first camera 410 includes the dual-pixel image sensor 415b and the second camera 420 includes the image sensor 425b including the phase sensor 421, the disclosure is not limited thereto and the opposite is also possible, and both the first camera 410 and the second camera 420 may include the dual-pixel image sensor 415b or both the first camera 410 and the second camera 420 may include the image sensor 425b including the phase sensor 421. Alternatively, one of the first camera 410 and the second camera 420 may include the dual-pixel image sensor 415b or the image sensor 425b including the phase sensor 421. The image sensors 415a and 415b, the dual-pixel image sensor 415b, and the image sensor 425b including the phase sensor 421 will be described in more detail with reference to FIGS. 5A, 5B, and 5C.

According to an embodiment of the disclosure, an image to be displayed on the display 440 out of the first input image or the second input image may be determined based on a camera configuration of the electronic device 401. For example, when the camera configuration is set to a first mode, the processor 460 may display the first input image obtained from the first camera 410 on the display 440. When the camera configuration is set to a second mode, the processor 460 may display the second input image obtained from the second camera 420 on the display 440. When the camera configuration is set to a third mode, the processor 460 may display on the display 440, the combined image generated by combining the first input image obtained from the first camera 410 with the second input image obtained from the second camera 420.

According to an embodiment of the disclosure, the camera configuration may be set by default in the electronic device 401 or may be set or changed according to user's selection.

In the disclosure, for easiness of description, it is assumed that the camera configuration is set to a first camera mode (the first mode?) in which the first input image obtained from the first camera 410 is displayed as the image to be displayed on the display 440.

When an AF operation for the first input image (or the second input image) is requested, the AF sensor 430 may automatically detect an AF area in which an object is in focus. According to an embodiment of the disclosure, the AF operation may include touch AF based on a touch or continuous AF in which a moving object is continuously in focus.

The display 440 may include the entire processor 160 illustrated in FIG. 1 or a part thereof. The display 440 may display the first input image obtained from the first camera 410 and the second input image obtained from the second camera 420. The display 440 may apply a specific image effect to at least a part of the first input image (or the second input image) and display the image effect-applied image.

According to an embodiment of the disclosure, the display 440 may sequentially display a first image in which a first image effect is applied to at least a part of the first input image (or the second input image) or a second image in which a second image effect is applied (to at least a part of the second input image?). For example, the first image effect may be an image effect in which an image effect of a first type is applied at a first level, and the second image effect may be an image effect in which the first-type image effect is applied at a second level that is higher than the first level.

In the disclosure, the 'level' of the image effect may mean a strength or intensity of the image effect, in which as the level increases, the strength or the intensity of the image effect may increase.

According to an embodiment of the disclosure, the processor 460 may apply an image effect to at least a part of the first input image (or the second input image) based on a focus area (e.g., the touch-based area, the AF area, a facial (or object) area, a designated area, etc.) obtained according to an operation (e.g., a touch operation, an auto recognition operation (e.g., the AF operation or a facial (or object) recognition operation), etc.) for setting the focus area, and display the image effect-applied image on the display 440. For example, the image effect may be applied to the focus area or to an area except for the focus area, and the image effect-applied image may be displayed.

According to an embodiment of the disclosure, the memory 450 may include the entire memory 130 illustrated in FIG. 1 or the entire memory 230 illustrated in FIG. 2, or a part of the memory 130 or 230. The memory 450 may include an image buffer, etc., that stores, in the unit of a frame, an input image (e.g., the first input image or the second input image) obtained from at least one of the first camera 410 or the second camera 420. The memory 450 may store information about the focus area (e.g., the touch-based area, the AF area, the facial (or object) area, the designated area, etc.) obtained according to the operation (e.g., the touch operation, the auto recognition operation (e.g., the AF operation or the facial (or object) recognition operation), etc.) for setting the focus area.

According to an embodiment of the disclosure, the memory 450 may store first meta information which includes phase difference information regarding the first input image obtained using the first input image or phase difference information regarding the second input image obtained using the second input image. The memory 450 may store a first depth map which includes first distance information regarding each pixel of the first input image or the second input image obtained based on the phase difference information.

According to an embodiment of the disclosure, the memory 450 may store second meta information which includes disparity information between the first input image and the second input image, which is obtained using the first input image and the second input image. The memory 450 may store a second depth map which includes second distance information regarding each pixel of the first input image or the second input image obtained based on the disparity information.

According to an embodiment of the disclosure, the memory 450 may store a temporary operation value generated in a process of obtaining the first input image, the second input image, or the combined image generated by combining the first input image with the second input image and a temporary operation value generated in a process of obtaining the phase difference information, the disparity information, the first depth map information, or the second depth map information.

According to an embodiment of the disclosure, the memory 450 may store a type of an image effect applicable to the first input image or the second input image. According to an embodiment of the disclosure, the type of the image effect may include at least one of the out-focusing effect, the blurring effect, or the bokeh effect. The type of the image effect may further include the color filter effect that is set differently for each area.

According to an embodiment of the disclosure, the memory 450 may store at least one of the first input image, the second input image, or the combined image generated by combining the first input image with the second input, received from the server 106. The memory 450 may store an area (e.g., the first area or the second area) of the image received from the server 106 (e.g., the first input image, the second input image, or the combined image generated by combining the first input image with the second input image) to which the image effect is to be applied.

According to various embodiments of the disclosure, the processor 460 may control the electronic device 401 overall. For example, the processor 460 may apply the first image effect to at least a part of the first input image based on a first object area corresponding to the focus area for the first input image, which is obtained using the first input image between the first input image obtained from the first camera 410 or the second input image obtained from the second camera 420 and display the first image effect-applied image on the display 440.

According to an embodiment of the disclosure, the processor 460 may execute an application for applying the first-type image effect, upon receiving a request for applying the first-type image effect (e.g., at least one of an out-focusing effect, the blurring effect, the bokeh effect, or the color filter effect) to the first input image.

The processor 460 may perform the operation for setting the focus area upon execution of the application. For example, the processor 460 may determine whether a touch input with respect to the first input image is received based on the touch operation as the operation for setting the focus area.

According to an embodiment of the disclosure, the processor 460 may obtain the touch-based area based on a touch point of the touch input, when the touch input with respect to the first input image is received. For example, an area of a designated size around the touch point may be obtained as the touch-based area. The designated size may be set by the user or may be preset in the electronic device. When the touch-based area is obtained, the processor 460 may set the touch-based area as the focus area for the first input image.

According to an embodiment of the disclosure, the processor 460 may apply an image effect to the first input image based on the touch-based area, and display the image effect-based image. For example, the processor 460 may apply the image effect to the touch-based area of the first input image and display the image effect-applied image on the display 440, or apply the image effect to an area of the first input image except for the touch-based area and display the image effect-applied image on the display 440.

According to an embodiment of the disclosure, the processor 460 may change a level of the image effect according to an intensity (strength) (e.g., a force touch, the number of times, or a time) of the touch input, and display the level-changed, effect-applied image on the display 440. For example, the processor 460 may display on the display 440, the first input image in which the level of the image effect applied thereto increases as the intensity, number of times, or time of the touch input increases.

According to an embodiment of the disclosure, the processor 460 may perform the auto recognition operation (e.g., the AF operation, the facial (or object) recognition operation, etc.) as the operation for setting the focus area, when the touch input with respect to the first input image is not received. For example, the processor 460 may set the auto recognition area (e.g., the AF area, the facial (or object) area, etc.) obtained through the auto recognition operation with respect to the first input image as the focus area.

According to an embodiment of the disclosure, the processor 460 may determine through the AF operation as the auto recognition operation whether the AF area in the first input image is obtained. When the AF area is obtained through the AF operation, the processor 460 may set the AF area as the focus area for the first input image. According to an embodiment of the disclosure, the processor 460 may determine through the facial (or object) recognition operation as the auto recognition operation whether the facial (or object) area in the first input image is obtained using a facial (or object) recognition technique. The processor 460 may set the facial (or object) area as the focus area when the facial (or object) area is obtained.

According to an embodiment of the disclosure, the processor 460 may set a designated area as the focus area for the first input image when the auto recognition area (e.g., the AF area, the facial (or object) area, etc.) is not obtained through the auto recognition operation. For example, when the AF area is not obtained by the first camera 410 through the AF operation, the processor 460 may determine that the object is out of focus through the AF operation and set the designated area as the focus area with respect to the first input image. When any facial (or object) area in the first input image is not obtained as a result of performing the facial (or object) recognition operation, the processor 460 may determine that no facial (or object) area exists or facial (or object) recognition fails, and thus set the designated area as the focus area for the first input image.

According to an embodiment of the disclosure, the designated area may be previously designated by the user or may be set in the electronic device 401. For example, the designated area may be one of an area of a specific size (e.g., an area having a preset size with respect to a central position) and the entire area in the first input image.

According to various embodiments of the disclosure, the processor 460 may apply the first image effect to at least a part of the first input image based on a first object area corresponding to the focus area (e.g., one of the touch-based area, the auto recognition area (e.g., the AFT area or the facial (or object) area), and the designated area) in the first input image, which is obtained using phase difference information of the first input image, and display the first image effect-applied image on the display 440 of the electronic device 401.

According to an embodiment of the disclosure, the processor 460 may obtain the first meta information including the phase difference information regarding the first input image by using the first input image. The processor 460 may obtain the first object area corresponding to the focus area by using the phase difference information. For example, the processor 460 may obtain the phase difference information indicating phase differences between first signals (e.g., first sub image signals or first phase signals) and second signals (e.g., second sub image signals or second phase signals) obtained from first sub pixels and second sub pixels in the dual-pixel image sensor 415*b* of the first camera 410. Once obtaining the phase difference information, the processor 460 may generate the first meta information including the phase difference information. Once generating the first meta information including the phase difference information, the processor 460 may generate the first depth map based on the phase difference information. For example, the processor 460 may generate the first depth map including first distance information corresponding to each pixel of the first input image calculated based on the phase difference information.

For example, the processor 460 may group pixels for each position according to a preset phase difference level based on the phase difference information, determine that pixels in the same group are located at the same distance, give distance information corresponding to the phase difference level to each pixel group, and thus calculate the first distance information for each pixel of the first input image. The processor 460 may generate the first depth map including the calculated first distance information. The processor 460 may obtain an object area corresponding to the focus area as the first object area by using the first depth map. For example, the processor 460 may generate a first mask image for the object area corresponding to the focus area by using the first depth map. The processor 460 may apply a Gaussian filter to the first depth map to generate the first mask image, and extract the object area corresponding to the focus area based on the first mask image. The processor 460 may obtain the first object area by setting the extracted area as the first object area.

According to an embodiment of the disclosure, the processor 460 may obtain segmentation information by segmenting the first input image based on the phase difference information. The electronic device may obtain the area corresponding to the focus area as the first object area by using the segmentation information.

According to an embodiment of the disclosure, the processor 460 may detect the first object area based on the segmentation information regarding the first input image, when the first meta information does not include the phase difference information. According to an embodiment of the disclosure, the processor 460 may perform color quantization with respect to the first input image. For example, the color quantization may mean that colors in a high dynamic range (HDR) correspond to a set of a fixed number of colors. The processor 460 may generate a segmentation map based on the segmentation information obtained by segmenting and analyzing the color-quantized first input image. According to an embodiment of the disclosure, the segmentation map may include at least one of a saliency map or a global contrast map. The processor 460 may obtain the object area corresponding to the focus area as the first object area by using the segmentation map. For example, the processor 460 may extract the object area corresponding to the focus area by using a combination of the saliency map and the global contrast map. The processor 460 may obtain the extracted object area as the first object area.

According to an embodiment of the disclosure, when receiving the first input image and the second input image from the server 106, the processor 406 may receive the first meta information including the phase difference information regarding the first input image (or the second input image) by using the first input image (or the second input image) received from the server 106. The processor 460 may obtain a first area, obtained based on the phase difference information, as the first object area.

According to an embodiment of the disclosure, the processor 460 may apply the first image effect to at least a part of the first input image, based on the obtained first object area, and display the first image effect-applied image. According to an embodiment of the disclosure, the processor 460 may display on the display 440, the first image in which the first image effect is applied to the first object area of the first input image. According to an embodiment of the disclosure, the processor 460 may display on the display 440, the first image in which the first image effect is applied to an area of the first input image except for the first object area. According to an embodiment of the disclosure, the first image effect may be an image effect in which the first-type image effect is applied at the first level.

According to various embodiments of the disclosure, the processor 460 may apply the second image effect to at least a part of the first input image based on a second object area corresponding to the focus area (e.g., one of the touch-based area, the AF area, the facial (or object) area, and the designated area) in the first input image, which is obtained using disparity information between the first input image and the second input image, and display the second image effect-applied image on the display 440 of the electronic device 401.

According to an embodiment of the disclosure, the processor 460 may obtain second meta information which includes disparity information between the first input image and the second input image by using the first input image and the second input image. The processor 460 may obtain the second object area corresponding to the focus area by using the disparity information. For example, the processor 460 may obtain the disparity information indicating disparity between the first input image obtained from the first camera and the second input image obtained from the second camera. For example, the processor 460 may use one of the first camera 410 or the second camera 420 as a left-eye camera and the other as a right-eye camera as the first camera 410 and the second camera 420 are arranged spaced apart from each other by a specific interval. Thus, the processor 460 may obtain the disparity information for accurately detecting distances from objects based on a phase difference between the first input image and the second input image by using one of the first input image and the second input image obtained from the first camera 410 and the second camera 420, respectively, as the left-eye input image and the other as the right-eye input image.

According to an embodiment of the disclosure, the processor 460 may obtain the disparity information indicating phase differences between first signals (e.g., first sub image signals or first phase signals) and second signals (e.g., second sub image signals or second phase signals) respectively obtained from first sub pixels and second sub pixels in the dual-pixel image sensor 415b or 425b of the first camera 410, and first signals (e.g., first sub image signals or first phase signals) and second signals (e.g., second sub image signals or second phase signals) respectively obtained from first sub pixels and second sub pixels in the dual-pixel image sensor 415b or 425b of the second camera 420. Once obtaining the disparity information, the processor 460 may generate the second meta information including the disparity information. When generating the second meta information including the disparity information, the processor 460 may generate the second depth map based on the disparity information. For example, the processor 460 may generate the second depth map including second distance information corresponding to each pixel of the first input image calculated based on the disparity information. For example, the processor 460 may group pixels for each position according to a preset phase difference level based on the disparity information, determine that pixels in the same group are located at the same distance, give distance information corresponding to the phase difference level to each pixel group, and thus calculate the second distance information for each pixel of the first input image. The processor 460 may generate the second depth map including the calculated second distance information. The processor 460 may obtain an object area corresponding to the focus area as the second object area by using the second depth map. For example, the processor 460 may generate a second mask image for the object area corresponding to the focus area by using the second depth map. The processor 460 may apply a Gaussian filter to the second depth map to generate the second mask image and extract the object area corresponding to the focus area based on the second mask image. The processor 460 may obtain the extracted object area as the second object area.

According to an embodiment of the disclosure, the processor 460 may obtain segmentation information by segmenting the first input image based on the disparity information. The electronic device may obtain the area corresponding to the focus area as the second object area by using the segmentation information.

According to an embodiment of the disclosure, the second object area obtained based on the disparity information may be an area that is matched to an object corresponding to the focus area more precisely than the first object area obtained based on the phase difference information.

According to an embodiment of the disclosure, when receiving the first input image and the second input image from the server 106, the processor 406 may obtain as the second object area, the second area obtained based on the disparity information between the first input image and the second input image received from the server 106.

According to an embodiment of the disclosure, the processor 460 may apply the second image effect to at least a part of the first input image, based on the obtained second object area, and display the second image effect-applied image. According to an embodiment of the disclosure, the processor 460 may display on the display 440, the second image in which the second image effect is applied to the second object area of the first input image. According to an embodiment of the disclosure, the processor 460 may display on the display 440, the second image in which the second image effect is applied to an area of the first input image except for the second object area. According to an embodiment of the disclosure, the second image effect may be an image effect in which the first-type image effect is applied at the second level that is higher than the first level.

Figure 5A:
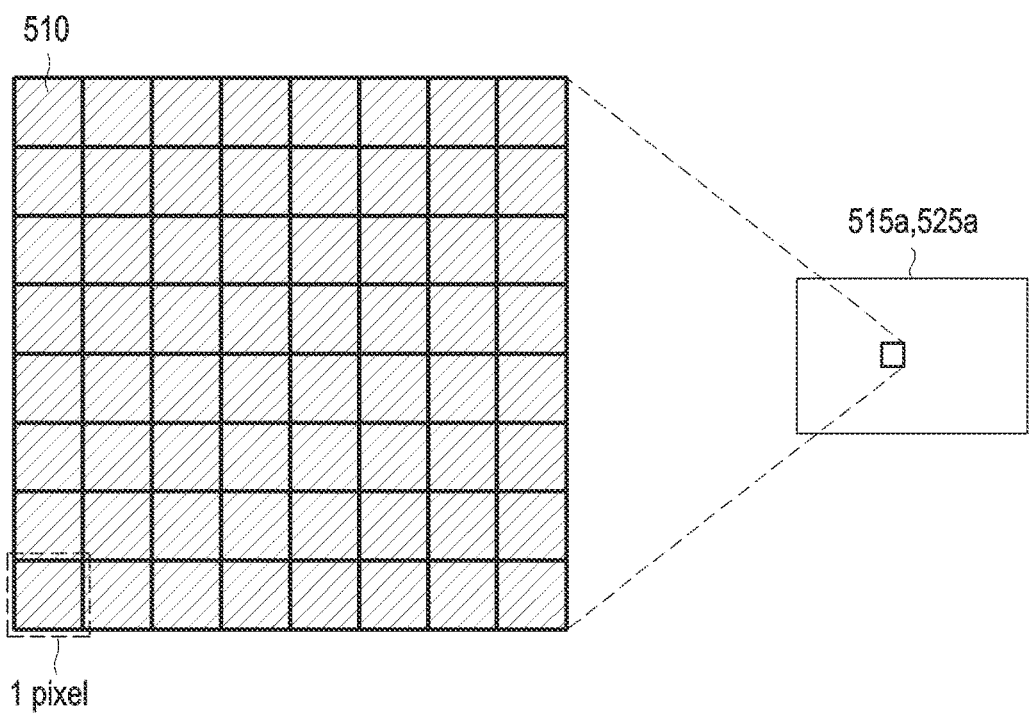
FIG. 5A illustrates a structure of an image sensor illustrated in FIG. 4A.
Figure 5B:
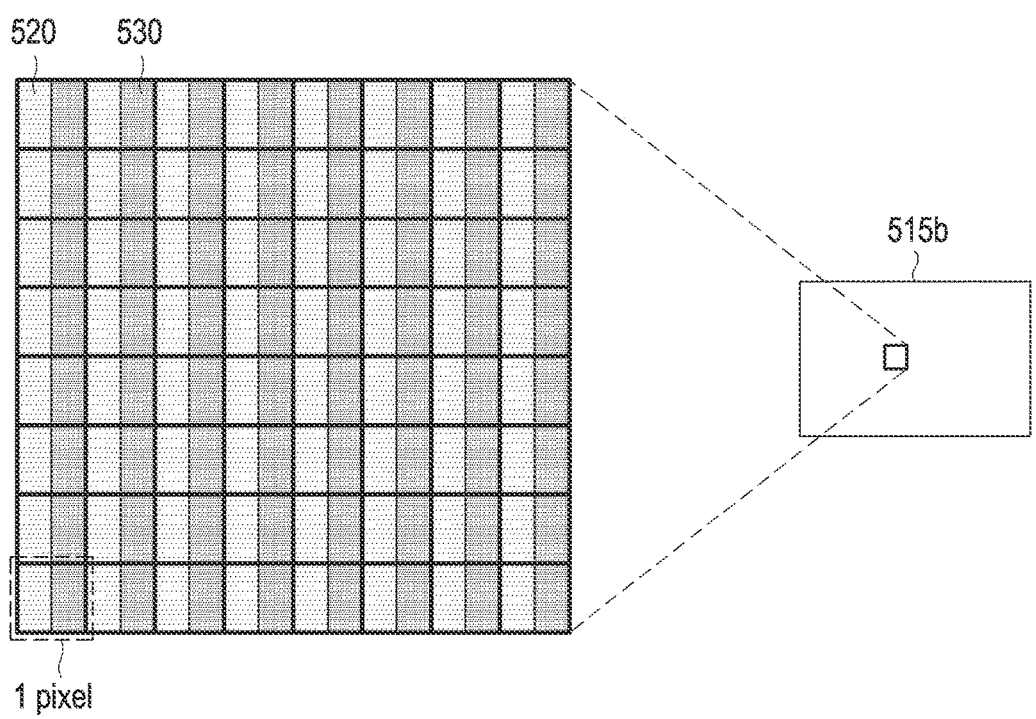
FIG. 5B illustrates a structure of a dual-pixel image sensor illustrated in FIG. 4B.
Figure 5C:
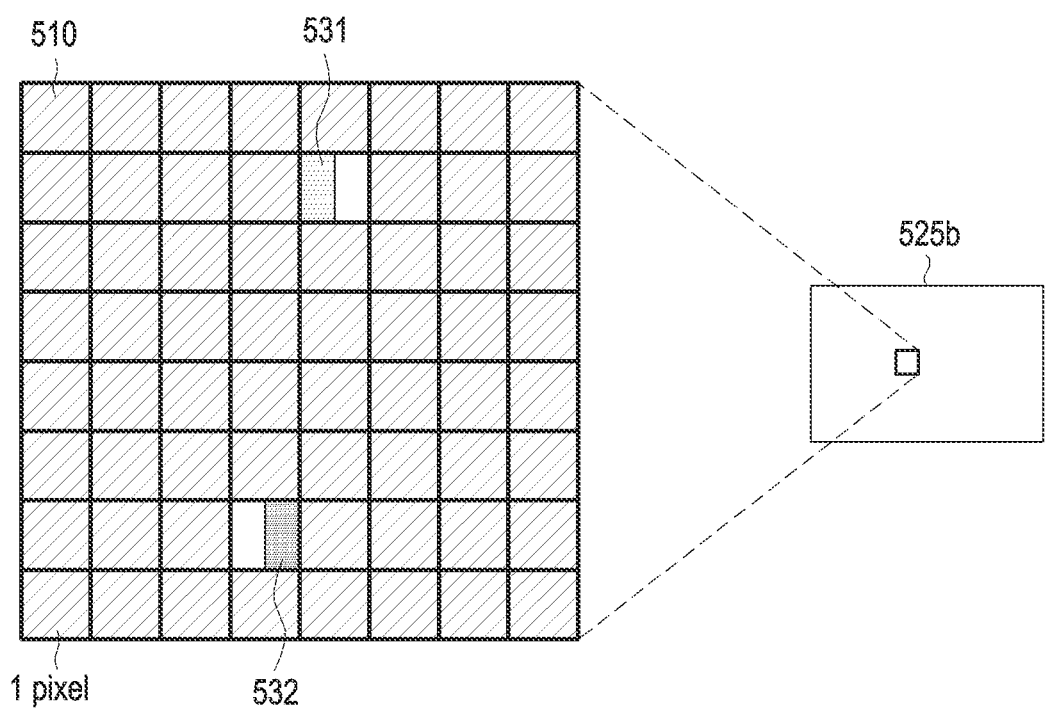
FIG. 5C illustrates a structure of an image sensor including a phase sensor illustrated in FIG. 4B.

FIG. 5A illustrates a structure of an image sensor illustrated in FIG. 4A, FIG. 5B illustrates a structure of a dual-pixel image sensor illustrated in FIG. 4B, and FIG. 5C illustrates a structure of an image sensor including a phase sensor illustrated in FIG. 4B.

Referring to FIG. 5A, parts of the image sensors 515*a* and 525*a* that are the same as the image sensors 415*a* and 425*a* illustrated in FIG. 4A are illustrated enlarged. The image sensors 515*a* and 525*a* may include a plurality of optical sensors (e.g., photodiodes) (not shown) capable of sensing light corresponding to a plurality of pixels 510, and obtain an input image by detecting an electrical image signal for each pixel 510 corresponding to the light sensed through the plurality of optical sensors (not shown).

Referring to FIG. 5B, a part of a dual-pixel image sensor 515*b* that is the same as the dual-pixel image sensor 415*b* illustrated in FIG. 4*b* is illustrated enlarged. The dual-pixel image sensor 515*b* may include two sub pixels for each pixel, e.g., a first sub pixel 520 for detecting a first signal (e.g., a first sub image signal) corresponding to the pixel and a second sub pixel 530 for detecting a second signal (e.g., a second sub image signal) corresponding to the pixel. The dual-pixel image sensor 415*b* may simultaneously detect the first signal and the second signal corresponding to each pixel through the first sub pixel 520 and the second sub pixel 530. According to an embodiment of the disclosure, the processor 460 may generate the phase difference information indicating the phase difference between the first signal and the second signal, detected through the dual-pixel image sensor 515*b*, for each pixel. The phase difference information generated through the dual-pixel image sensor 515*b* may include phase difference information regarding all pixels in the dual-pixel image sensor 515*b*. In this way, the input image (e.g., the first input image or the second input image) obtained through the dual-pixel image sensor 515*b* may obtain the phase difference information corresponding to all pixels without a loss of the input image.

Referring to FIG. 5C, a part of an image sensor 525*b* including a phase sensor which is the same as the image sensor 425*b* including the phase sensor illustrated in FIG. 4*b* is illustrated enlarged. The image sensor 525*b* including the phase sensor may include a phase sensor (e.g., a first phase sensor 531 and a second phase sensor 532) capable of detecting in positions corresponding to some pixels among all pixels included in the image sensor 525*b*, a phase signal corresponding to the corresponding pixels. According to an embodiment of the disclosure, the phase sensor (e.g., the first phase sensor 531 or the second phase sensor 532) may be arranged in pixels corresponding to about 5% of all the pixels. The image sensor 525*b* including the phase sensor (e.g., the first phase sensor 531 or the second phase sensor 532) may simultaneously detect an image signal detected through the optical sensor 510 and a phase signal (e.g., a first phase signal or a second phase signal) detected through the phase sensor (e.g., the first phase sensor 531 or the second phase sensor 532). For example, the first phase sensor 531 may detect the first phase signal, and the second phase sensor 532 may detect the second phase signal. According to an embodiment of the disclosure, the processor 460 may generate the phase difference information indicating the phase difference between the first signal and the second signal, detected through the image sensor 525*b* including the phase sensor (e.g., the first phase sensor 531 or the second phase sensor 532), for each pixel. The phase difference information generated through the image sensor 525*b* including the phase sensor 531 or 532 may include phase difference information regarding some pixels in the image sensor 525*b*. In this way, the input image (e.g., the first input image or the second input image) obtained through the image sensor 525*b* including the phase sensor 531 or 532 may have an image loss corresponding to a rate at which the phase sensor (e.g., the first phase sensor 531 or the second phase sensor 532) is arranged. According to an embodiment of the disclosure, the phase sensor (e.g., the first phase sensor 531 or the second phase sensor 532) may be arranged in positions corresponding to about 5% of all the pixels. For example, with respect to the input image obtained by the phase sensor illustrated in FIG. 5C or the dual-pixel image sensor 515*b* illustrated in FIG. 5B, the input image obtained by the image sensor 525*b* including the phase sensor illustrated in FIG. 5C may have an image loss of about 5%.

According to various embodiments of the disclosure, an electronic device (e.g., the electronic device 401) may include a first camera (e.g., the first camera 410) arranged on a first surface of a housing of the electronic device 401, a second camera (e.g., the second camera 420) arranged spaced apart from the first camera 410 on the first surface, a display (e.g., the display 440), and a processor (e.g., the processor 460) configured to apply a first image effect to at least a part of a first input image that is obtained from the first camera 410, based on a first object area for the first input image, the first object area being obtained using phase difference information of the first input image between the first input image and a second input image obtained from the second camera 420, and display the first image effect-applied first input image on the display 440 and to apply a second image effect to at least a part of the first input image based on a second object area for the first input image, the second object area being obtained using disparity information between the first input image and the second input image, and display the second image effect-applied first input image on the display 440.

According to various embodiments of the disclosure, the processor 460 may be configured to obtain a still image corresponding to the first input image to which the second image effect is applied, and may further include a memory (e.g., the memory 450) in which the obtained still image is stored.

According to various embodiments of the disclosure, the processor 460 may be configured to obtain the phase difference information indicating phase differences between first signals and second signals respectively obtained from first sub-pixels and second sub-pixels in an image sensor (e.g., the dual-pixel image sensor 415b or the image sensor 425b including a phase sensor) of the first camera 410 and to obtain the disparity information indicating phase differences between the first signals and the second signals respectively obtained from the first sub-pixels and the second sub-pixels in the image sensor 415 or 425b of the first camera 410, and first signals and second signals respectively obtained from first sub-pixels and second sub-pixels in an image sensor (e.g., the dual-pixel image sensor 415b or the image sensor 425b including a phase sensor) of the second camera 420.

According to various embodiments of the disclosure, the first image effect may be an image effect in which an image effect of a first type is applied at a first level, and the second image effect may be an image effect in which the first-type image effect is applied at a second level that is higher than the first level.

According to various embodiments of the disclosure, the first-type image effect may include at least one of an out-focusing effect, a blurring effect, a bokeh effect, or a color filter effect that is set differently for each area.

According to various embodiments of the disclosure, at least one of the first camera 410 or the second camera 420 may include a dual-pixel image sensor (e.g., the dual-pixel image sensor 415b).

According to various embodiments of the disclosure, at least one of the first camera 410 or the second camera 420 may include an image sensor (e.g., the image sensor 425b) including a phase sensor (e.g., the phase sensor 421).

According to various embodiments of the disclosure, the processor 460 may be further configured to set a focus area for the first input image upon input of a request for applying an image effect to the first input image.

According to an embodiment of the disclosure, the processor 460 may be configured to determine whether a touch input with respect to the first input image is received and to set a touch-based area obtained based on a touch point of the touch input as the focus area, when the touch input is received. According to an embodiment of the disclosure, the processor 460 may be configured to determine whether an auto recognition area corresponding to an auto recognition operation with respect to the first input image is obtained, when the touch input is not received, and to set the obtained auto recognition area as the focus area, when the auto recognition area is obtained. According to an embodiment of the disclosure, the processor 460 may be further configured to set a designated area as the focus area, when the auto recognition area is not obtained.

According to an embodiment of the disclosure, the auto recognition operation may include an AF operation or a facial recognition operation. According to an embodiment of the disclosure, the auto recognition area may include an AF area obtained through the AF operation or a facial area obtained through the facial recognition operation.

According to an embodiment of the disclosure, the processor 460 may be configured to determine whether the phase difference information using the first input image is obtained, to generate a first depth map including first distance information corresponding to each pixel of the first input image based on the phase difference information, when the phase difference information is obtained, to obtain an object area corresponding to the focus area for the first input image by using the first depth map and set the obtained object area as the first object area, to generate a first image in which the first image effect is applied to the first input image based on the set first object area, and to display the generated first image on the display 440.

According to an embodiment of the disclosure, the processor 460 may be configured to generate a second depth map including second distance information corresponding to each pixel of the first input image, based on the disparity information, when the disparity information using the first input image and the second input image is obtained, while displaying the first image, to obtain an object area corresponding to the focus area by using the second depth map and set the obtained object area as the second object area, to generate a second image in which the second image effect is applied to the first input image, based on the set second object area, and to display the generated second image on the display 440.

According to an embodiment of the disclosure, the processor 460 may be further configured to obtain a touch-based area based on a touch point of the touch input, when the touch input with respect to the first input image is received before the first image is displayed, to generate an image in which the image effect is applied to at least a part of the first input image based on the touch-based area, and to display the generated image on the display 440.

According to an embodiment of the disclosure, the processor 460 may be further configured to change a level of the image effect according to an intensity a number of times or a time of the touch input.

According to an embodiment of the disclosure, the processor 460 may be further configured to increase the level of the image effect as the intensity of the touch input increases.

According to an embodiment of the disclosure, the processor 460 may be further configured to increase the level of the image effect as the number of times of the touch input increases.

According to an embodiment of the disclosure, the processor 460 may be further configured to increase the level of the image effect as the time of the touch input increases.

According to an embodiment of the disclosure, the processor 460 may be further configured to determine whether the phase difference information using the first input image is obtained, to perform color quantization with respect to the first input image when the phase difference information is not obtained, to generate a segmentation map based on the color-quantized image, and to obtain an object area corresponding to the focus area for the first input image by using the segmentation map and set the obtained object area as the first object area.

Figure 6:
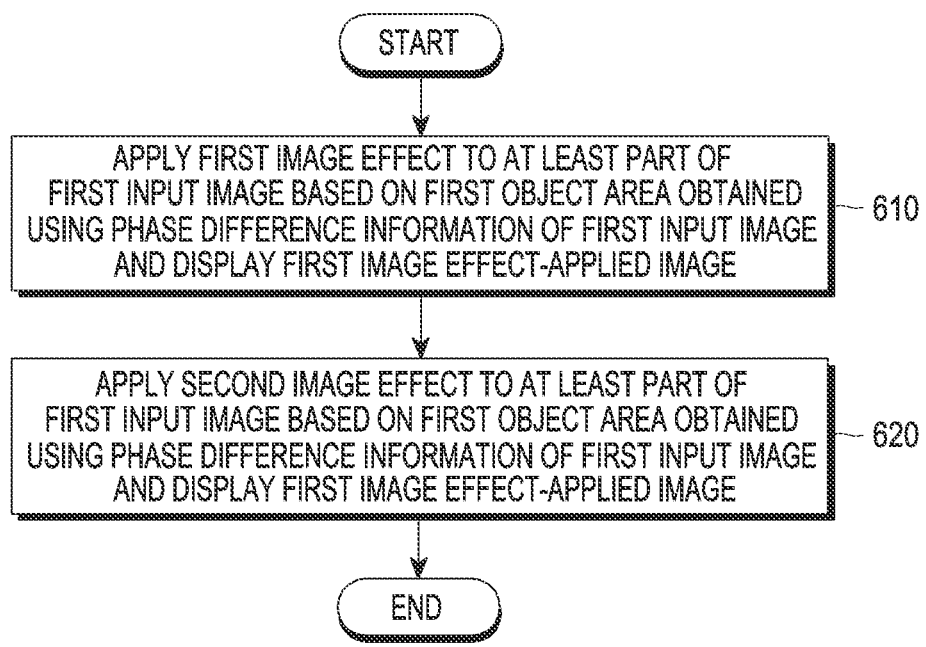
FIG. 6 is a flowchart illustrating a method for displaying an image in an electronic device according to various embodiments of the disclosure.

FIG. 6 is a flowchart illustrating a method for displaying an image in an electronic device according to various embodiments of the disclosure. The method for displaying an image in the electronic device may include operations 610 and 620. The method for displaying an image in the electronic device may be performed by at least one of the electronic device (e.g., the electronic device 401) or the processor (e.g., the processor 460) of the electronic device.

In operation 610, for example, the electronic device may apply a first image effect to at least a part of a first input image based on a first object area for the first input image, which is obtained using phase difference information of the first input image between the first input image obtained from a first camera (e.g., the first camera 410) arranged on a first surface of a housing of the electronic device or a second input image obtained from a second camera (e.g., the second camera 420) of the electronic device arranged spaced apart from the first camera on the first surface, and display the first image effect-applied image on a display (e.g., the display 440).

According to an embodiment of the disclosure, the electronic device may set a focus area for the first input image, upon receiving a request for applying the first type-image effect to the first input image. For example, the electronic device may determine whether a touch input with respect to the first input image based on the touch operation as the operation for setting the focus area is received. When the touch input is received, the electronic device may set the touch-based area obtained based on a touch point of the touch input as the focus area for the first input image.

According to an embodiment of the disclosure, the electronic device may perform the auto recognition operation (e.g., the AF operation, the facial (or object) recognition operation, etc.) with respect to the first input image, as the operation for setting the focus area, when the touch input is not received. For example, the electronic device may set the auto recognition area (e.g., the AF area, the facial (or object) area, etc.) obtained through the auto recognition operation with respect to the first input image as the focus area.

According to an embodiment of the disclosure, the electronic device may determine through the AF operation as the auto recognition operation whether the AF area in the first input image is obtained. When the AF area in the first input image is obtained through the AF operation, the electronic device may set the AF area as the focus area for the first input image.

According to an embodiment of the disclosure, the electronic device may determine through the facial (or object) recognition operation as the auto recognition operation whether the facial (or object) area is obtained using the facial (or object) recognition technique. When the facial (or object) area in the first input image is obtained, the electronic device may set the facial (or object) area as the focus area for the first input image.

According to an embodiment of the disclosure, when the auto recognition area is not objected, the electronic device may set a designated area as the focus area for the first input image.

According to an embodiment of the disclosure, the designated area may be previously designated by the user or may be set in the electronic device. For example, the designated area may be one of an area of a specific size (e.g., an area having a preset size with respect to a central position) and the entire area in the first input image.

According to an embodiment of the disclosure, the first image effect may be an image effect in which the first-type image effect is applied at the first level. According to an embodiment of the disclosure, the first-type image effect may include at least one of the out-focusing effect, the blurring effect, the bokeh effect, or the color filter effect in which a color is set differently for each area.

According to an embodiment of the disclosure, the electronic device may obtain the first meta information including the phase difference information regarding the first input image by using the first input image. For example, the electronic device may obtain the phase difference information indicating phase differences between first signals (e.g., first sub image signals or first phase signals) and second signals (e.g., second sub image signals or second phase signals) respectively obtained from first sub pixels (e.g., the first sub pixel 520 or the first phase sensor 531) and second sub pixels (e.g., the second sub pixel 530 or the second phase sensor 532) in an image sensor (e.g., the dual-pixel image sensor 515*b* or the image sensor 525*b* including the phase sensor) of the first camera. Once obtaining the phase difference information, the electronic device may generate the first meta information including the phase difference information.

According to an embodiment of the disclosure, the electronic device may obtain a first object area corresponding to the focus area (e.g., one of the touch-based area, the AF area, the facial (or object) area, or the designated area) in the first input image by using the phase difference information. For example, when generating the first meta information including the disparity information by using the first input image, the electronic device may generate the first depth map based on the phase difference information. For example, the electronic device may generate the first depth map including first distance information corresponding to each pixel of the first input image calculated based on the phase difference information. The electronic device may obtain the first object area corresponding to the focus area for the first input image by using the generated first depth map.

According to an embodiment of the disclosure, the electronic device may perform color quantization with respect to the first input image when the first meta information including the phase difference information using the first input image is not obtained, generate a segmentation map based on the color-quantized image, obtain an object area corresponding to the focus area for the first input image by using the segmentation map, and set the obtained object area as the first object area.

According to an embodiment of the disclosure, the electronic device may apply the first image effect to at least a part of the first input image, based on the first object area, and display the first image effect-applied image. According to an embodiment of the disclosure, the electronic device may display on the display of the electronic device, the first image in which the first image effect is applied to the first object area of the first input image. According to an embodiment of the disclosure, the electronic device may display on the display of the electronic device, the first image in which the first image effect is applied to an area of the first input image except for the first object area. According to an embodiment of the disclosure, the first image effect may be an image effect in which the first-type image effect is applied at the first level.

According to various embodiments of the disclosure, the electronic device may apply the second image effect to at least a part of the first input image based on a second object area for the first input image, which is obtained using disparity information between the first input image and the second input image, and display the second image effect-applied image on the display.

According to an embodiment of the disclosure, the electronic device may obtain second meta information which includes disparity information between the first input image and the second input image by using the first input image and the second input image.

According to an embodiment of the disclosure, the electronic device may use one of the first camera or the second camera as a left-eye camera and the other as a right-eye camera as the first camera and the second camera are arranged spaced apart from each other by a specific interval. Thus, the electronic device may obtain the disparity information for accurately detecting distances from objects based on a phase difference between the first input image and the second input image by using one of the first input image and the second input image obtained from the first camera and the second camera, respectively, as the left-eye input image and the other as the right-eye input image. For example, the electronic device may obtain the disparity information indicating phase differences between first signals (e.g., first sub image signals or first phase signals) and second signals (e.g., second sub image signals or second phase signals) respectively obtained from first sub pixels (e.g., the first sub pixel 520 or the first phase sensor 531) and second sub pixels (e.g., the second sub pixel 530 or the second phase sensor 532) in an image sensor (e.g., the dual-pixel image sensor 515b or the image sensor 525b including the phase sensor) of the first camera, and first signals (e.g., first sub image signals or first phase signals) and second signals (e.g., second sub image signals or second phase signals) respectively obtained from first sub pixels (e.g., the first sub pixel 520 or the first phase sensor 531) and second sub pixels (e.g., the second sub pixel 530 or the second phase sensor 532) in an image sensor (e.g., the dual-pixel image sensor 515b or the image sensor 525b including the phase sensor) of the second camera. Once obtaining the disparity information, the electronic device may generate the second meta information including the disparity information.

According to an embodiment of the disclosure, the disparity information indicating disparity between the first input image and the second input image respectively obtained by the first camera and the second camera may include phase difference information improved more than the phase difference information obtained from an image sensor of at least one of the first camera or the second camera.

According to an embodiment of the disclosure, the electronic device may generate the second depth map including the second distance information corresponding to each pixel of the first input image calculated based on the disparity information.

According to an embodiment of the disclosure, the electronic device may obtain a first object area corresponding to the focus area (e.g., one of the touch-based area, the AF area, the facial (or object) area, or the designated area) in the first input image by using the disparity information. For example, when generating the second meta information including the disparity information by using the first input image and the second input image, the electronic device may generate the second depth map based on the disparity information. For example, the electronic device may generate the second depth map including the second distance information corresponding to each pixel of the first input image calculated based on the disparity information. The electronic device may obtain the second object area corresponding to the focus area for the first input image by using the generated second depth map.

According to an embodiment of the disclosure, the electronic device may display the second image in which the second image effect is applied to at least a part of the first input image based on the second object area, on the display of the electronic device. According to an embodiment of the disclosure, the electronic device may display on the display of the electronic device, the second image in which the second image effect is applied to the second object area of the first input image. According to an embodiment of the disclosure, the electronic device may display on the display of the electronic device, the second image in which the second image effect is applied to an area of the first input image except for the second object area. According to an embodiment of the disclosure, the second image effect may be an image effect in which the first-type image effect is applied at the second level that is higher than the first level.

Figure 7A:
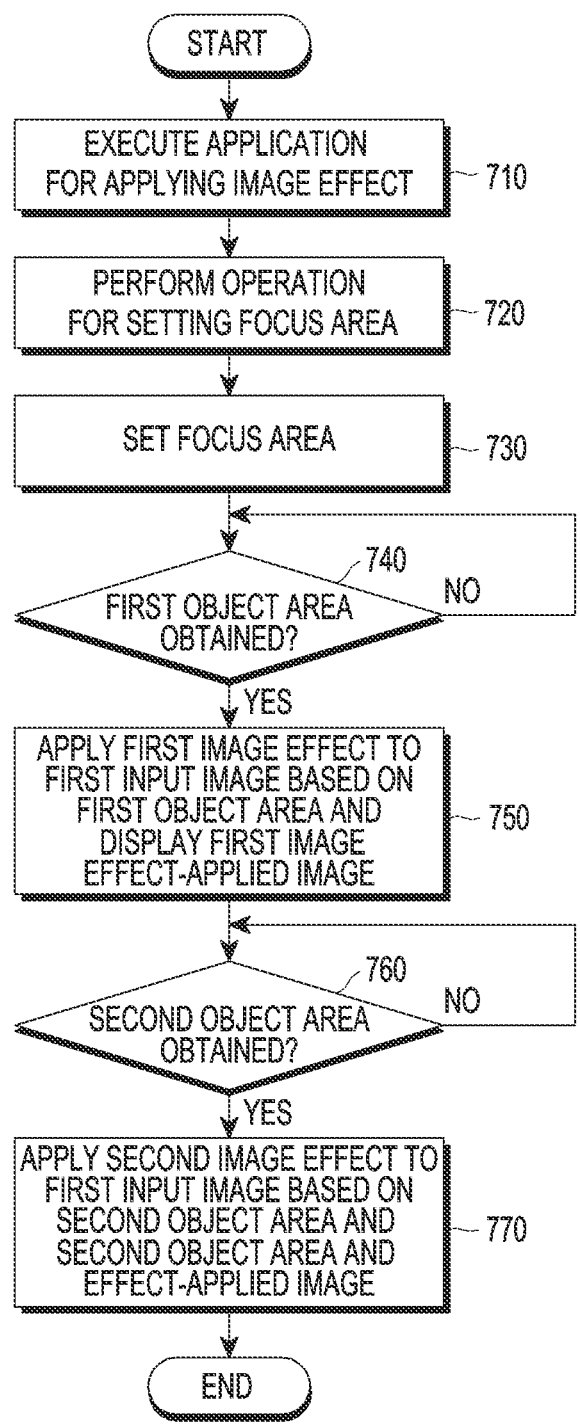
FIGS. 7A and 7B are flowcharts illustrating a method for displaying an image in an electronic device according to various embodiments of the disclosure.

FIG. 7A is a flowchart illustrating a method for displaying an image in an electronic device according to various embodiments of the disclosure. The method for displaying an image in the electronic device may include operations 710 through 770. The method for displaying an image in the electronic device may be performed by at least one of the electronic device (e.g., the electronic device 401) or the processor (e.g., the processor 460) of the electronic device.

In operation 710, for example, the electronic device may execute an application for applying an image effect to an image (e.g., a first input image or a second input image) obtained from the electronic device or an external electronic device (e.g., the server 106).

According to an embodiment of the disclosure, the electronic device may execute an application for applying a first-type image effect to one of a first input image obtained from a first camera (e.g., the first camera 410) arranged on a first surface of a housing of the electronic device and a second input image obtained from a second camera (e.g., the second camera 420) of the electronic device arranged spaced apart from the first camera on the first surface. The first-type image effect may include at least one of the out-focusing effect, the blurring effect, the bokeh effect, or the color filter effect that is set differently for each area.

In operation 720, for example, the electronic device may perform an operation for obtaining a focus area. For example, the electronic device may perform an operation for obtaining the focus area for the first input image between the first input image and the second input image.

According to an embodiment of the disclosure, an operation for setting the focus area may include a touch operation or an auto recognition operation. According to an embodiment of the disclosure, the electronic device may obtain a touch-based area corresponding to the touch operation as the operation for setting the focus area. According to an embodiment of the disclosure, the electronic device may obtain an auto recognition area (e.g., an AF area or a facial (or object) area) corresponding to an auto recognition operation (e.g., an AF operation or a facial (or object) recognition operation) as the operation for setting the focus area. According to an embodiment of the disclosure, the electronic device may obtain a designated area for the first input image when the touch-based area corresponding to the touch operation or the auto recognition area corresponding to the auto recognition operation is not obtained. According to an embodiment of the disclosure, the designated area may be previously designated by the user or may be set in the electronic device.

According to an embodiment of the disclosure, the electronic device may apply the image effect to at least a part of the first input image, based on the touch-based area, and display the image effect-applied image. For example, the electronic device may apply the image effect to the touch-based area of the first input image and display the image effect-applied first input image on the display (e.g., the display 440) of the electronic device. The electronic device may apply the image effect to an area of the first input image except for the touch-based area and display the image effect-applied first input image on the display.

According to an embodiment of the disclosure, the electronic device may change a level of the image effect according to an intensity, the number of times, or a time of the touch input, and display the level-changed, effect-applied image on the display. For example, the electronic device may display on the display of the electronic device, the first input image in which the level of the image effect applied thereto increases as the intensity, number of times, or time of the touch input increases.

The operation for setting the focus area will be described in more detail with reference to FIG. 7B.

In operation 730, for example, the electronic device may set an area obtained by performing the operation for setting the focus area as the focus area. According to an embodiment of the disclosure, the area obtained by performing the operation for setting the focus area may include the touch-based area, the auto recognition area, or the designated area. According to an embodiment of the disclosure, the auto recognition area may include the AF area or the facial (or object) area.

In operation 740, for example, the electronic device may determine whether a first object area corresponding to the focus area (e.g., one of the touch-based area, the auto recognition area, or the designated area) in the first input image is obtained. The electronic device may perform operation 750 when the first object area is obtained and perform operation 740 when the first object area is not obtained.

According to an embodiment of the disclosure, the electronic device may obtain the first object area corresponding to the focus area by using the first input image. For example, the electronic device may obtain first meta information including phase difference information by using the first input image. The electronic device may obtain the phase difference information indicating phase differences between first signals and second signals respectively detected from first sub-pixels and second sub-pixels in an image sensor of the first camera from the first input image. The electronic device may obtain the first object area corresponding to the focus area based on the phase difference information.

According to an embodiment of the disclosure, the electronic device may obtain the first object area based on the segmentation information regarding the first input image when the first meta information does not include the phase difference information.

According to an embodiment of the disclosure, when receiving the first input image and the second input image from a server (e.g., the server 106), the electronic device may obtain as the first object area, an area obtained based on phase difference information obtained using the first input image received from the server or an area obtained based on phase difference information obtained using the first input image.

In operation 750, for example, the electronic device may apply the first image effect to at least a part of the first input image, based on the obtained first object area, and display the first image effect-applied image.

According to an embodiment of the disclosure, the electronic device may display on the display, the first image in which the first image effect is applied to the first object area of the first input image. According to an embodiment of the disclosure, the electronic device may display on the display, the first image in which the first image effect is applied to an area of the first input image except for the first object area.

According to an embodiment of the disclosure, the first image effect may be an image effect in which the first-type image effect is applied at the first level.

In operation 760, for example, the electronic device may determine whether a second object area corresponding to the focus area (e.g., one of the touch-based area, the AF area, the facial (or object) area, or the designated area) in the first input image is obtained. The electronic device may perform operation 770 when the second object area is obtained, and perform operation 760 when the second object area is not obtained.

According to an embodiment of the disclosure, the electronic device may obtain the second object area corresponding to the focus area by using the first input image and the second input image. For example, the electronic device may obtain second meta information which includes disparity information indicating disparity between the first input image and the second input image by using the first input image and the second input image. The electronic device may obtain the phase difference information indicating phase differences (i.e., disparity) between first signals and second signals respectively detected from first sub-pixels and second sub-pixels in an image sensor of the first camera, from the first input image and first signals and second signals respectively detected from first sub-pixels and second sub-pixels in an image sensor of the second camera from the second input image. The electronic device may obtain the second object area corresponding to the focus area based on the disparity information.

According to an embodiment of the disclosure, when receiving the first input image and the second input image from the server (e.g., the server 106), the electronic device may obtain as the second object area, the area obtained based on the disparity information obtained using the first input image and the second input image received from the server.

In operation 770, for example, the electronic device may apply the second image effect to at least a part of the first input image, based on the obtained second object area, and display the second image effect-applied image.

According to an embodiment of the disclosure, the electronic device may display on the display, the second image in which the second image effect is applied to the second object area of the first input image. According to an embodiment of the disclosure, the electronic device may display on the display, the second image in which the second image effect is applied to an area of the first input image except for the second object area.

According to an embodiment of the disclosure, the second image effect may be an image effect in which the first-type image effect is applied at the second level that is higher than the first level.

Figure 7B:
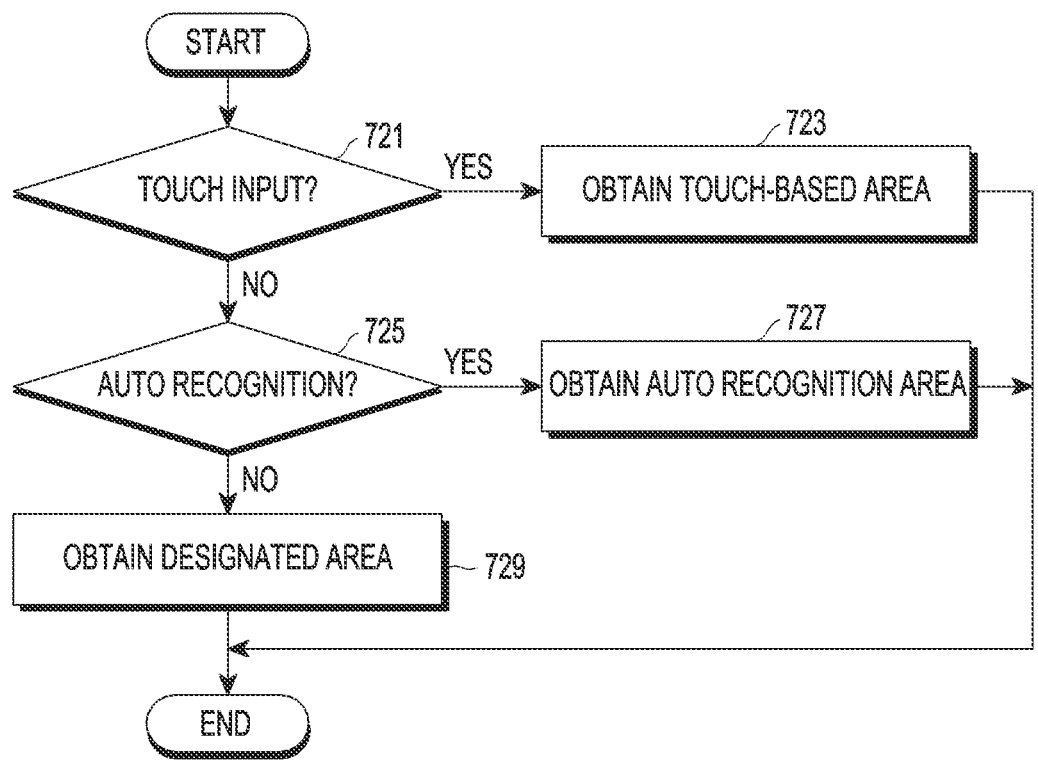

FIG. 7B is a flowchart illustrating a method for displaying an image in an electronic device according to various embodiments of the disclosure. FIG. 7B is a flowchart illustrating a scheme to perform operation 720 for setting the focus area in the method for displaying an image in the electronic device, illustrated in FIG. 7A, in which the scheme may include operations 721 through 729. The method for displaying an image in the electronic device may be performed by at least one of the electronic device (e.g., the electronic device 401) or the processor (e.g., the processor 460) of the electronic device.

In operation 721, for example, the electronic device may determine whether a touch input corresponding to the touch operation as the operation for setting the focus area is received. In operation 721, the electronic device may perform operation 723 when the touch input is received, and perform operation 725 when the touch input is not received.

In operation 723, for example, the electronic device may obtain the touch-based area based on a touch point of the touch input when the touch input with respect to the first input image is received. For example, an area of a designated size around the touch point may be obtained as the touch-based area. The designated size may be set by the user or may be preset in the electronic device 401.

In operation 725, for example, when the touch input with respect to the first input image is not received, the electronic device may determine whether the auto recognition area corresponding to the auto recognition operation as the operation for setting the focus area is obtained. In operation 725, the electronic device may perform operation 727 when the auto recognition area is obtained, and perform operation 729 when the auto recognition area is not obtained.

According to an embodiment of the disclosure, the auto recognition operation may include the AF operation or the facial (or object) recognition operation. For example, the electronic device may perform the AF operation as the auto recognition operation, when the touch input with respect to the first input image is not received. For example, the electronic device may perform the facial (or object) recognition operation as the auto recognition operation, when the touch input with respect to the first input image is not received. The electronic device may perform the AF operation when the touch input with respect to the first input image is not received, and perform the facial (or object) recognition operation when the AF area corresponding to the AF operation is not obtained.

In operation 727, for example, the electronic device may obtain the auto recognition area for the first input image when the auto recognition operation is performed.

According to an embodiment of the disclosure, the auto recognition area may include the AF area or the facial (or object) area for the first input image. For example, the electronic device may obtain the AF area that is automatically in focus for the first input image based on the AF operation as the auto recognition operation. The electronic device may obtain the facial (or object) area by using the facial (or object) recognition technique through the facial (or object) recognition operation as the auto recognition operation.

In operation 729, for example, the electronic device may obtain the designated area for the first input image when the auto recognition area for the first input is not obtained.

According to an embodiment of the disclosure, when the AF area is not obtained by the first camera (e.g., the first camera 410) through the AF operation, the electronic device may determine that the object is out of focus through the AF operation and obtain the designated area. According to an embodiment of the disclosure, when any facial (or object) area in the first input image is not obtained as a result of performing the facial (or object) recognition operation, the electronic device may determine that no facial (or object) area exists or facial (or object) recognition fails, and thus obtain the designated area.

According to an embodiment of the disclosure, the designated area may be previously designated by the user or may be set in the electronic device. For example, the designated area may be one of an area of a specific size (e.g., an area having a preset size with respect to a central position) and the entire area in the first input image.

Figure 8:
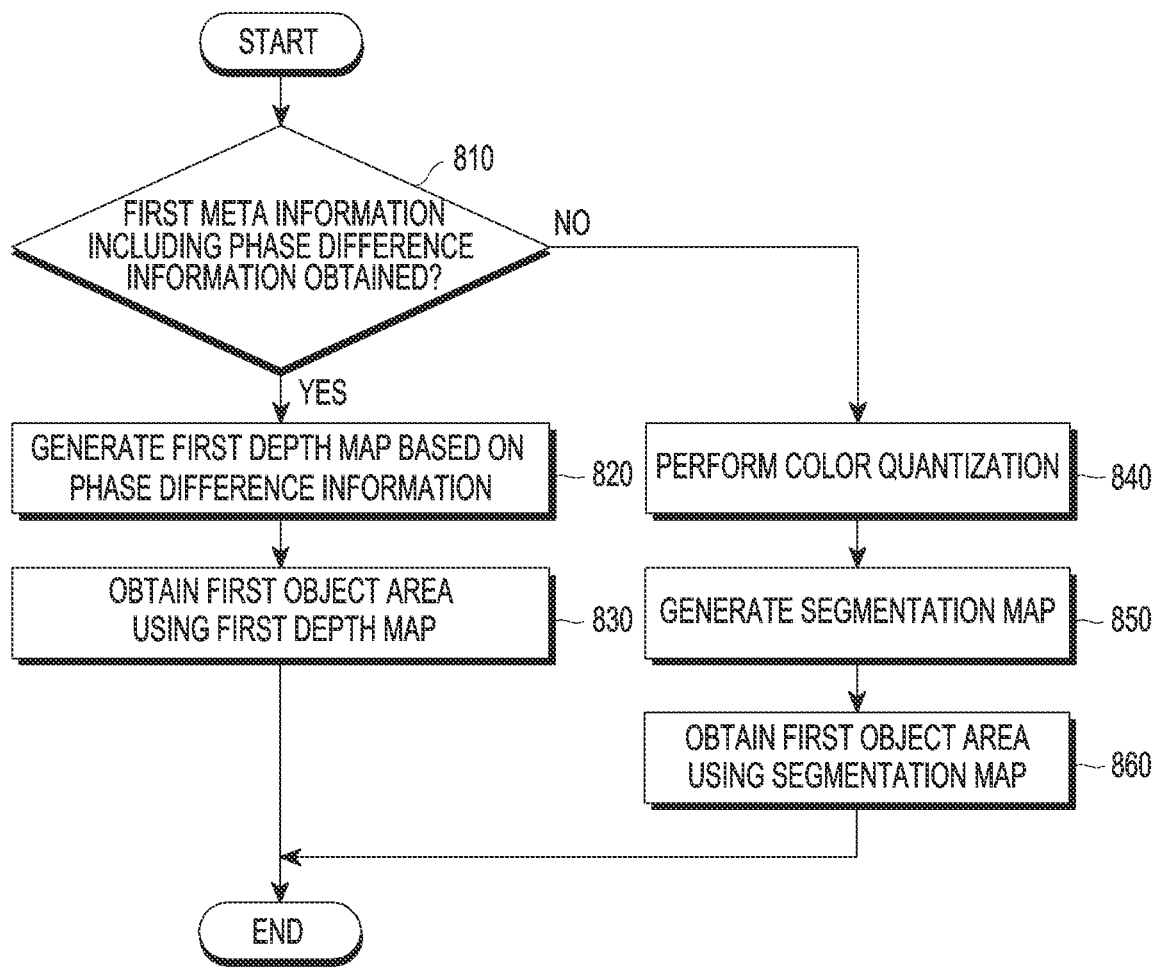
FIG. 8 is a flowchart illustrating a method for displaying an image in an electronic device according to various embodiments of the disclosure.

FIG. 8 is a flowchart illustrating a method for displaying an image in an electronic device according to various embodiments of the disclosure. FIG. 8 is a flowchart illustrating a scheme to obtain the first object area in operation 740 in the method for displaying an image in the electronic device, illustrated in FIG. 7A, in which the scheme may include operations 810 through 860. The method for displaying an image in the electronic device may be performed by at least one of the electronic device (e.g., the electronic device 401) or the processor (e.g., the processor 460) of the electronic device.

In operation 810, for example, the electronic device may determine using a first input image input from a first camera (e.g., the first camera 410) whether first meta information including phase difference information for the first input image is obtained. The electronic device may perform operation 820 when the first meta information including the phase difference information is obtained, and perform operation 840 when the first meta information including the phase difference information is not obtained.

According to an embodiment of the disclosure, the electronic device may obtain phase difference information indicating phase differences between first signals (e.g., first sub image signals or first phase signals) and second signals (e.g., second sub image signals or second phase signals) respectively obtained from first sub pixels and second sub pixels in an image sensor (e.g., the dual-pixel image sensor 515*b* or the image sensor 525*b* including the phase sensor) of the first camera for the first input image. Once obtaining the phase difference information, the electronic device may generate the first meta information including the phase difference information.

Once obtaining the first meta information including the phase difference information, the electronic device may generate the first depth map based on the phase difference information in operation 820. For example, the electronic device may generate the first depth map including first distance information corresponding to each pixel of the first input image calculated based on the phase difference information. For example, the electronic device may group pixels for each position according to a preset phase difference level based on the phase difference information, determine that pixels in the same group are located at the same distance, give distance information corresponding to the phase difference level to each pixel group, and thus calculate the first distance information for each pixel of the first input image. The electronic device may generate the first depth map including the calculated first distance information.

In operation 830, for example, the electronic device may obtain an object area corresponding to the focus area as the first object area by using the first depth map.

For example, the electronic device may generate a first mask image for the object area corresponding to the focus area by using the first depth map. The electronic device may apply a Gaussian filter to the first depth map to generate the first mask image, and extract the object area corresponding to the focus area based on the first mask image. The electronic device may obtain the extracted object area as the first object area.

Although not shown in FIG. 8, according to an embodiment of the disclosure, the electronic device may obtain segmentation information by segmenting the first input image based on the phase difference information. The electronic device may obtain the area corresponding to the focus area as the first object area by using the segmentation information.

In operation 840, for example, the electronic device may perform color quantization on the first input image when the first meta information including the phase difference information is not obtained.

In operation 850, for example, the electronic device may generate a segmentation map based on the segmentation information obtained by segmenting and analyzing the color-quantized first input image.

According to an embodiment of the disclosure, the segmentation map may include at least one of a saliency map or a global contrast map.

In operation 860, the electronic device may obtain an object area corresponding to the focus area as the first object area by using the segmentation map.

For example, the electronic device may extract the object area corresponding to the focus area by using a combination of the saliency map and the global contrast map. The electronic device may obtain the first object area by setting the extracted area as the first object area.

Figure 9:
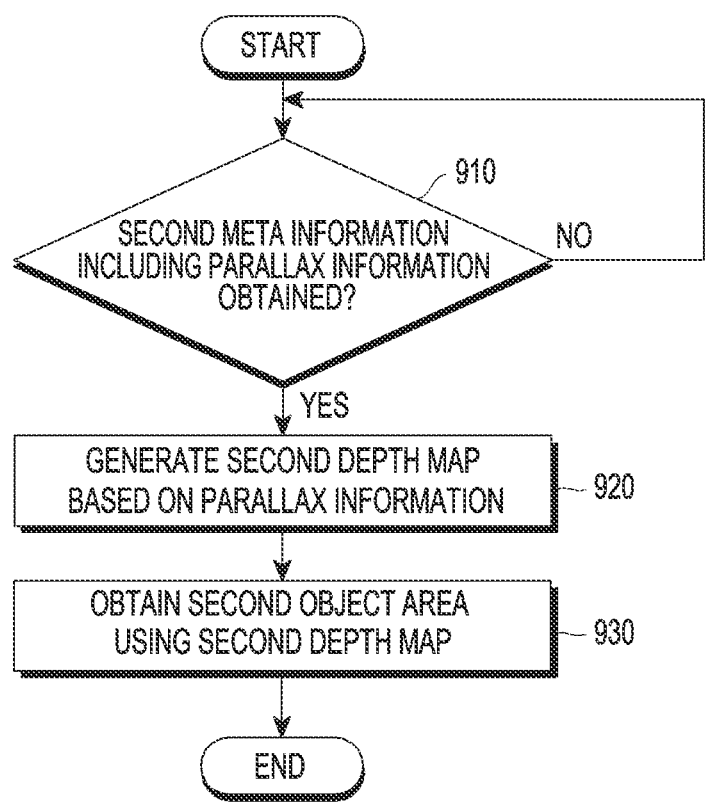
FIG. 9 is a flowchart illustrating a method for displaying an image in an electronic device according to various embodiments of the disclosure.

FIG. 9 is a flowchart illustrating a method for displaying an image in an electronic device according to various embodiments of the disclosure. FIG. 8 is a flowchart illustrating a scheme to obtain the second object area in operation 760 in the method for displaying an image in the electronic device, illustrated in FIG. 7A, in which the scheme may include operations 910 through 930. The method for displaying an image in the electronic device may be performed by at least one of the electronic device (e.g., the electronic device 401) or the processor (e.g., the processor 460) of the electronic device.

In operation 910, for example, the electronic device may determine using a first input image obtained from a first camera (e.g., the first camera 410) arranged on a first surface of a housing of the electronic device and a second input image obtained from a second camera (e.g., the second camera 420) of the electronic device arranged spaced apart from the first camera on the first surface, whether second meta information including disparity information indicating disparity between the first input image and the second input image is obtained. The electronic device may perform operation 920 when the second meta information including the disparity information is obtained, and repeat operation 910 when the second meta information including the disparity information is not obtained.

According to an embodiment of the disclosure, the electronic device may obtain disparity information indicating phase differences between first signals (e.g., first sub image signals or first phase signals) and second signals (e.g., second sub image signals or second phase signals) respectively obtained from first sub pixels and second sub pixels in an image sensor (e.g., the dual-pixel image sensor 515b or the image sensor 525b including the phase sensor) of the first camera for the first input image, and first signals (e.g., first sub image signals or first phase signals) and second signals (e.g., second sub image signals or second phase signals) respectively obtained from first sub pixels and second sub pixels in an image sensor (e.g., the dual-pixel image sensor 515b or the image sensor 525b including the phase sensor) of the second camera for the second input image. Once obtaining the disparity information, the electronic device may generate the second meta information including the disparity information.

In operation 920, when the second meta information including the disparity information is obtained, the electronic device may generate the second depth map based on the disparity information. For example, the electronic device may generate the second depth map including the second distance information corresponding to each pixel of the first input image calculated based on the disparity information. For example, the electronic device may group pixels for each position according to a preset phase difference level based on the disparity information, determine that pixels in the same group are located at the same distance, give distance information corresponding to the phase difference level to each pixel group, and thus calculate the first distance information for each pixel of the first input image. The electronic device may generate the second depth map including the calculated second distance information.

In operation 930, the electronic device may obtain an object area corresponding to the focus area as the second object area by using the second depth map.

According to an embodiment of the disclosure, the electronic device may generate a second mask image for the object area corresponding to the focus area by using the second depth map. The electronic device may apply a Gaussian filter to the second depth map to generate the second mask image, and extract the object area corresponding to the focus area based on the second mask image. The electronic device may obtain the extracted object area as the second object area.

Although not shown in FIG. 9, according to an embodiment of the disclosure, the electronic device may obtain segmentation information by segmenting the first input image based on the disparity information. The electronic device may obtain the area corresponding to the focus area as the second object area by using the segmentation information.

Figure 10A:
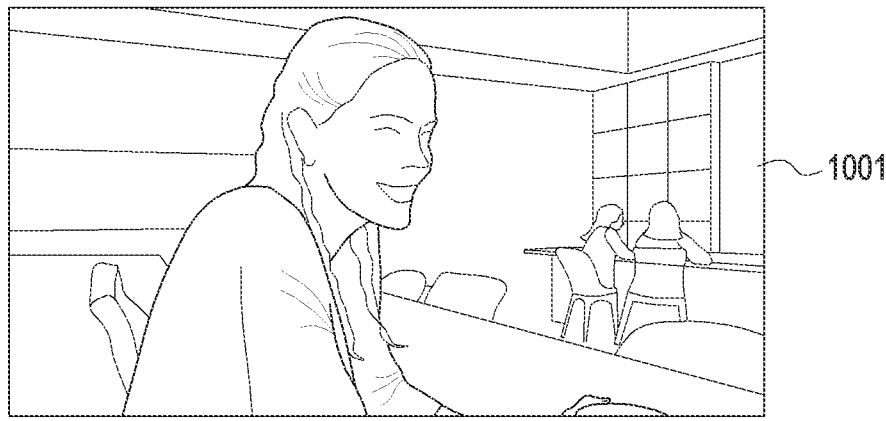
FIGS. 10A through 10C are views for describing a method for displaying an image in a touch-based area, according to various embodiments of the disclosure.
Figure 10B:
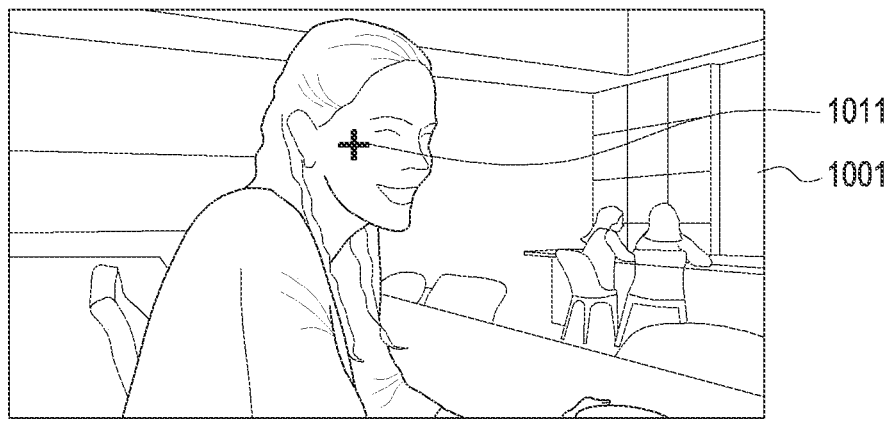
Figure 10C:
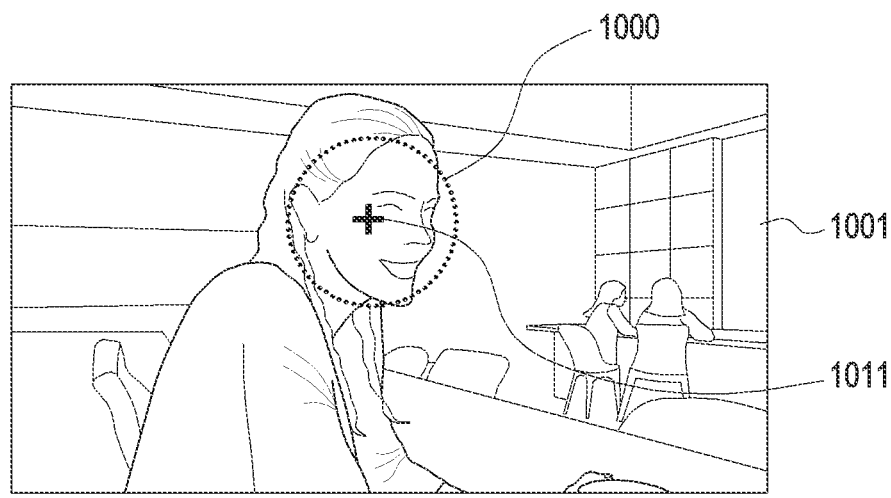

FIGS. 10A through 10C are views for describing a method for displaying an image in a touch-based area, according to various embodiments of the disclosure.

Referring to FIG. 10A, a first input image 1001 obtained from a first camera (e.g., the first camera 410) arranged on a first surface of a housing of an electronic device (e.g., the electronic device 401) is illustrated. A specific-type image effect may be applied to at least a part of the first input image 1001, and the image effect-applied image may be displayed on a display (e.g., the display 440) of the electronic device. An area corresponding to at least a part of the first input image 1001 may be obtained in various ways, and with reference to FIGS. 10B and 10C, a description will be made of a scheme to obtain the touch-based area corresponding to the touch operation as the operation for setting the focus area.

Referring to FIG. 10B, a touch point 1011 input by the touch operation with respect to the first input image 1001 is illustrated. For example, the electronic device may receive a touch input from the user at a specific point 1011 to apply the specific-type image effect to the at least a part of the first input image 1001, while displaying the first input image 1001.

Referring to FIG. 10C, a touch-based area 1000 for the first input image 1001 is illustrated.

According to an embodiment of the disclosure, the electronic device may obtain the touch-based area 1000 based on the touch point 1011 in the first input image 1001. For example, the electronic device may obtain an area having a designated size (e.g., a radius) around the touch point 1011 as the touch-based area 1000. The designated size may be set by the user or may be preset in the electronic device. The electronic device may apply a specific-type image effect (e.g., the out-focusing effect, the blurring effect, the bokeh effect, the color filtering effect, etc.) to the at least a part of the first input image 1001 based on the touch-based area 1000 and display the image effect-applied image 1001.

Figure 11A:
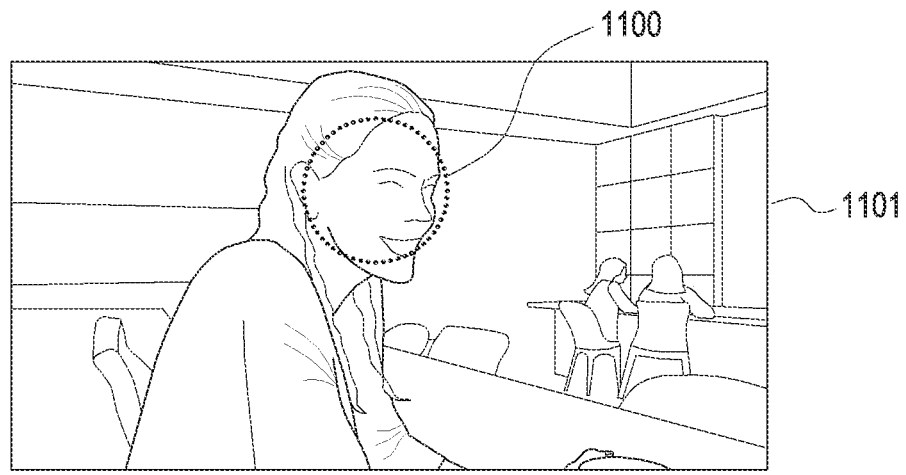
FIGS. 11A through 11C are views for describing a method for displaying an image in an area based on phase difference information obtained by at least one camera of an electronic device, according to various embodiments of the disclosure.
Figure 11B:
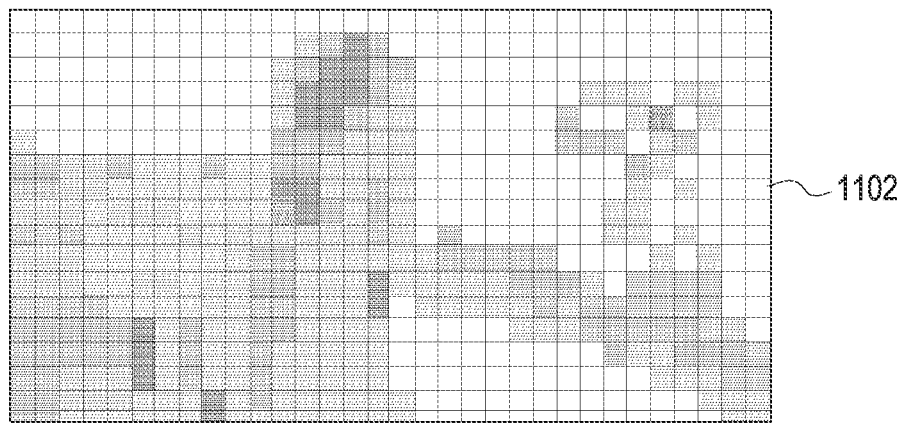
Figure 11C:
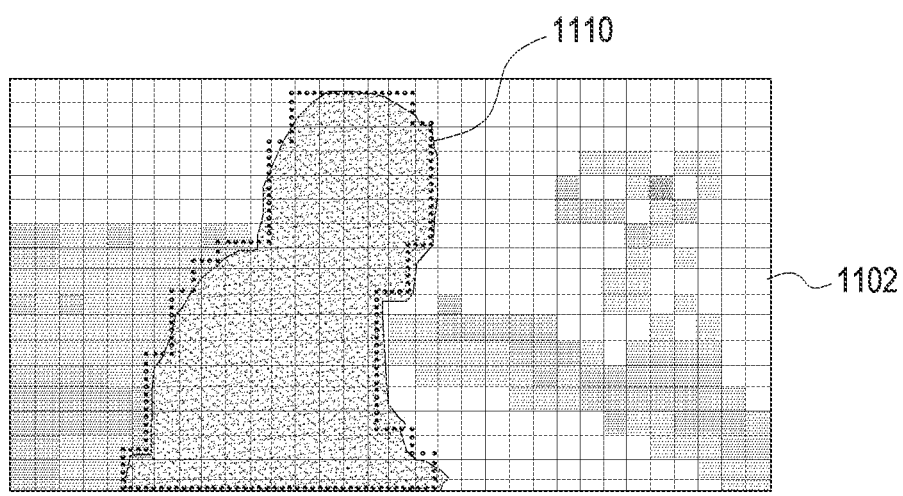

FIGS. 11A through 11C are views for describing a method for displaying an image in an area based on phase difference information obtained by at least one camera of an electronic device, according to various embodiments of the disclosure.

Referring to FIG. 11A, a first input image 1101 obtained from a first camera (e.g., the first camera 410) arranged on a first surface of a housing of an electronic device (e.g., the electronic device 401) is illustrated. The electronic device may obtain a focus area 1100 by performing an operation (e.g., the touch operation, the auto recognition operation (e.g., the AF operation or the facial (or object) recognition operation), etc.) for setting the focus area with respect to the first input image 1101. The electronic device may apply the specific-type image effect to at least a part (e.g., the first object area) corresponding to the focus area 1100 in the first input image 1101, and display the image effect-applied image 1101 on a display (e.g., the display 440) of the electronic device. The first object area in the first input image 1101 may be obtained in various ways, and with reference to FIGS. 11B and 11C, a description will be made of a scheme to obtain the first object area based on the phase difference information.

Referring to FIG. 11B, an input image 1102 converted from the first input image 1101 using a first depth map generated based on the phase difference information for the first input image 1101 is illustrated.

According to an embodiment of the disclosure, once obtaining first meta information including phase difference information for the first input image 1101 by using the first input image 1101, the electronic device may generate a first depth map including first distance information for each pixel of the first input image 1101 by using the phase difference information. The electronic device may generate the input image 1102 converted from the first input image 1101 based on the first depth map.

According to an embodiment of the disclosure, once obtaining first meta information including phase difference information for the first input image 1101 by using the first input image 1101, the electronic device may obtain segmentation information by segmenting and analyzing the first input image 1101 by using the phase difference information. The electronic device may generate an input image (not shown) converted from the first input image 1101 based on the segmentation information.

Referring to FIG. 11C, a first object area 1110 corresponding to the focus area 1100 (refer to FIG. 11A) in the converted input image 1102 is illustrated.

According to an embodiment of the disclosure, the electronic device may detect the first object area 1110 corresponding to the focus area 1100 from the input image 1102 converted from the first input image 1101 by using the first depth map. For example, the electronic device may obtain as the first object area 1110, an area corresponding to a pixel having a value that is similar to distance information in the focus area 1100. The electronic device may apply a specific-type image effect (e.g., the out-focusing effect, the blurring effect, the bokeh effect, the color filtering effect, etc.) to the at least a part of the first input image 1101 based on the first object area 1110 and display the image effect-applied image 1001.

Figure 12A:
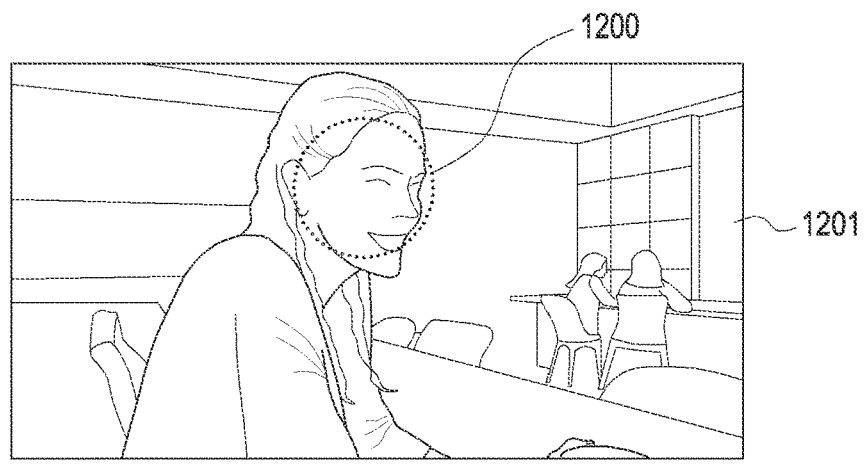
FIGS. 12A through 12C are views for describing a method for displaying an image in an area based on a segment obtained by at least one camera of an electronic device, according to various embodiments of the disclosure.
Figure 12B:
Figure 12C:
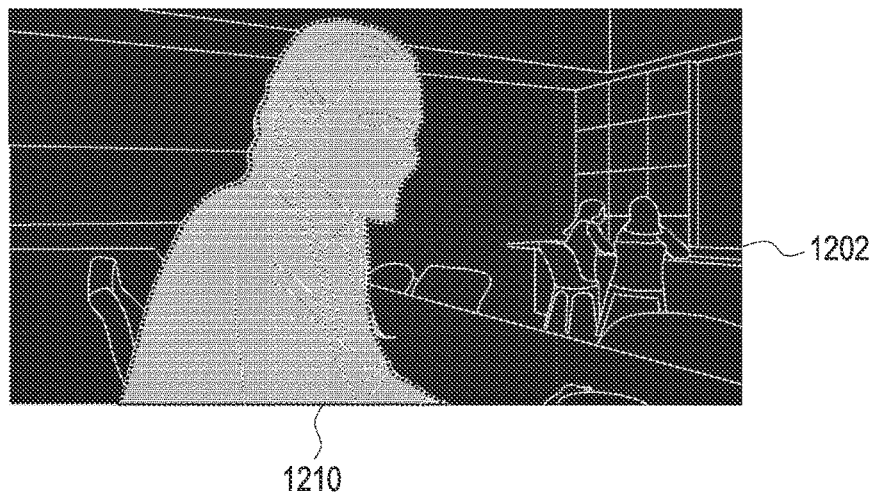

FIGS. 12A through 12C are views for describing a method for displaying an image in an area based on a segment obtained by at least one camera of an electronic device, according to various embodiments of the disclosure.

Referring to FIG. 12A, a first input image 1201 obtained from a first camera (e.g., the first camera 410) arranged on a first surface of a housing of an electronic device (e.g., the electronic device 401) is illustrated. The electronic device may obtain a focus area 1200 by performing an operation (e.g., the touch operation, the auto recognition operation (e.g., the AF operation or the facial (or object) recognition operation), etc.) for setting the focus area with respect to the first input image 1201. The electronic device may apply the specific-type image effect to at least a part (e.g., the first object area) corresponding to the focus area 1200 in the first input image 1201, and display the image effect-applied image 1101 on a display (e.g., the display 440) of the electronic device. The first object area in the first input image 1201 may be obtained in various ways, and with reference to FIGS. 12B and 12C, a description will be made of a scheme to obtain the first object area based on the segmentation information analyzed for the first input image.

Referring to FIG. 12B, an input image 1202 converted from the first input image 1201 based on the segmentation information for the first input image 1201 is illustrated.

According to an embodiment of the disclosure, the electronic device may obtain the segmentation information by analyzing the first input image 1201. According to an embodiment of the disclosure, once obtaining first meta information including phase difference information for the first input image 1201 by using the first input image 1201, the electronic device may obtain segmentation information by segmenting and analyzing the first input image 1201 by using the phase difference information. According to an embodiment of the disclosure, the electronic device may perform color quantization on the first input image 1201 and obtain the segmentation information by segmenting and analyzing the color-quantized first input image 1201. According to an embodiment of the disclosure, once obtaining second meta information including disparity information between the first input image 1201 and a second input image (not shown) obtained from a second camera (e.g., the second camera 420) located spaced apart from the first camera on the first surface, the electronic device may obtain segmentation information by segmenting and analyzing the first input image 1201 by using the disparity information.

According to an embodiment of the disclosure, the electronic device may generate the converted input image 1202 for the first input image 1201 by using a segmentation map (e.g., a saliency map or a global contrast map) generated based on the segmentation information.

Referring to FIG. 12C, a first object area 1210 corresponding to the focus area 1200 (refer to FIG. 12A) in the converted input image 1202 is illustrated.

According to an embodiment of the disclosure, the electronic device may detect the first object area 1210 corresponding to the focus area 1200 from the input image 1202 converted from the first input image 1201 by using the segmentation map. For example, the electronic device may obtain as the first object area 1210, an area corresponding to an object (e.g., a person) recognized corresponding to the focus area 1200. The electronic device may apply a specific-type image effect (e.g., the out-focusing effect, the blurring effect, the bokeh effect, the color filtering effect, etc.) to the at least a part of the first input image 1201 based on the first object area 1210 and display the image effect-applied image 1001.

FIGS. 13A through 13E are views for describing a method for displaying an image in an area based on disparity information obtained by dual cameras of an electronic device, according to various embodiments of the disclosure.

Figure 13A:
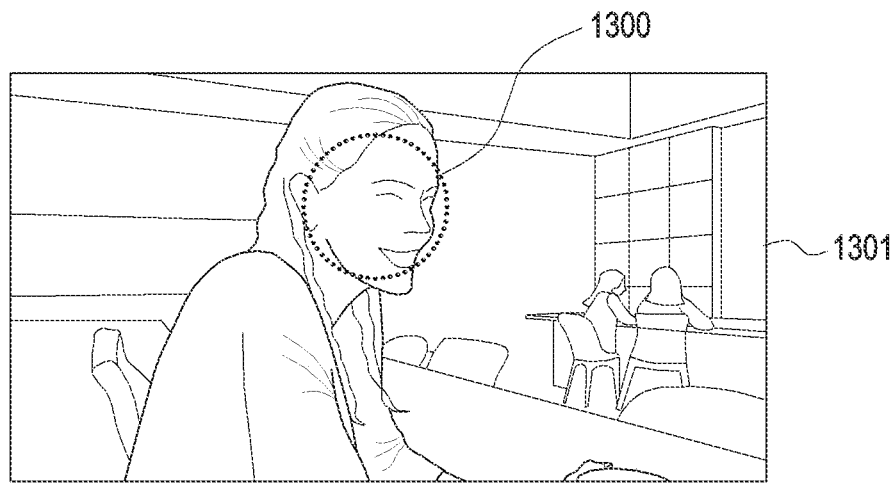
FIGS. 13A through 13E are views for describing a method for displaying an image in an area based on disparity information obtained by dual cameras of an electronic device, according to various embodiments of the disclosure.

Referring to FIG. 13A, a first input image 1301 obtained from a first camera (e.g., the first camera 410) arranged on a first surface of a housing of an electronic device (e.g., the electronic device 401) is illustrated. The electronic device may obtain a focus area 1300 by performing an operation (e.g., the touch operation, the auto recognition operation (e.g., the AF operation or the facial (or object) recognition operation), etc.) for setting the focus area. The electronic device may apply the specific-type image effect to at least a part (e.g., the second object area) corresponding to the focus area 1300 in the first input image 1301, and display the image effect-applied image 1101 on a display (e.g., the display 440) of the electronic device. The second object area in the first input image 1301 may be obtained in various ways, and for example, with reference to FIGS. 13B through 13E, a description will be made of a scheme to obtain the second object area based on disparity information indicating disparity between the first input image 1301 and a second input image (not shown) obtained from a second camera (e.g., the second camera 420) located spaced apart from the first camera.

Figure 13B:
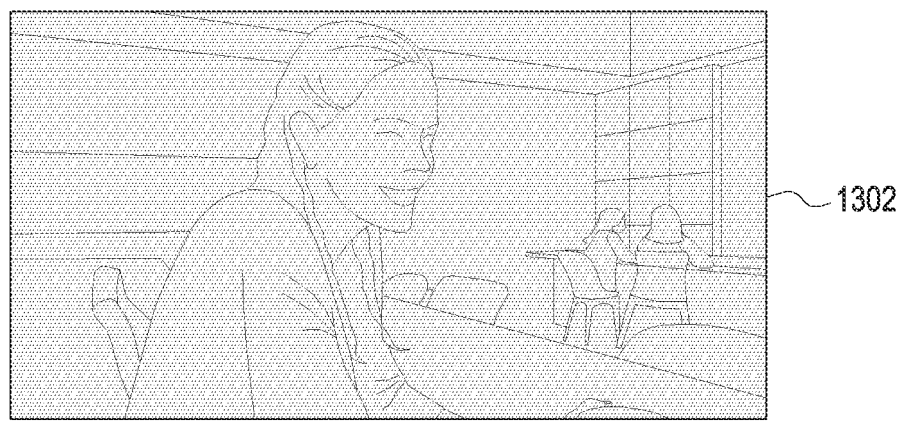

Referring to FIG. 13B, an input image 1302 converted from the first input image 1301 using the second depth map generated based on the disparity information between the first input image 1301 and the second input image (not shown) is illustrated.

According to an embodiment of the disclosure, once obtaining second meta information including the disparity information between the first input image 1301 and the second input image (not shown), the electronic device may generate a second depth map including second distance information for each pixel of the first input image 1201 by using the disparity information. The electronic device may generate the input image 1302 converted from the first input image 1301 based on the first depth map.

According to an embodiment of the disclosure, once obtaining the second meta information including the disparity information between the first input image 1301 and the second input image 1302, the electronic device may obtain segmentation information by segmenting and analyzing the first input image 1301 by using the disparity information. The electronic device may generate an input image (not shown) converted from the first input image 1301 based on the segmentation information.

Figure 13C:
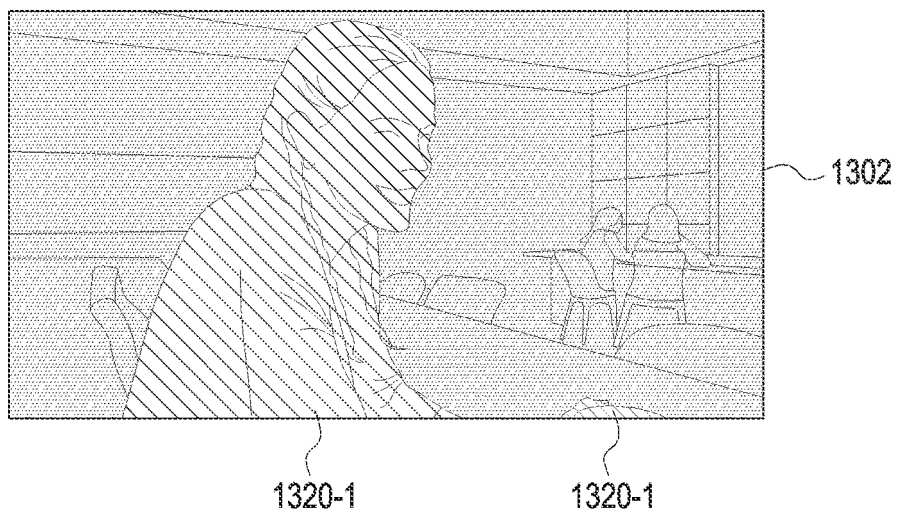

Referring to FIG. 13C, a second object area 1320-1 corresponding to the focus area 1300 (refer to FIG. 13A) in the converted input image 1302 is illustrated.

According to an embodiment of the disclosure, the electronic device may detect the second object area 1320-1 corresponding to the focus area 1300 from the input image 1302 converted from the first input image 1301 by using the second depth map. For example, the electronic device may obtain as the second object area 1320-1, an area corresponding to a pixel having a value that is similar to distance information in the focus area 1300.

Figure 13D:
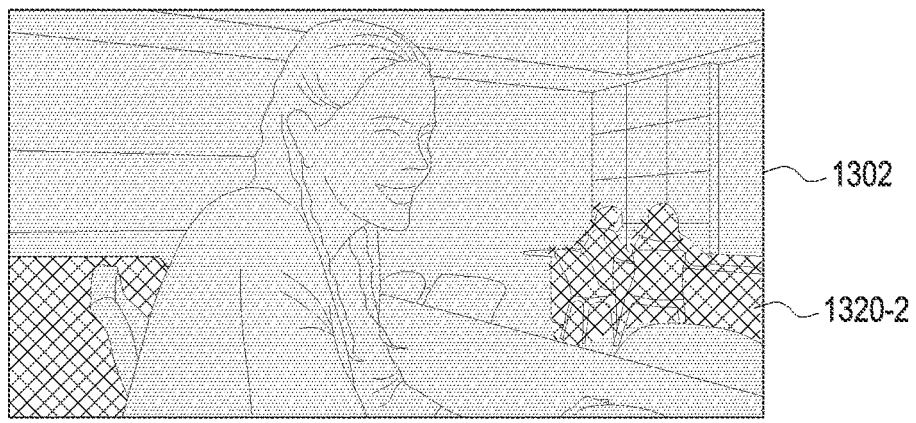
Figure 13E:
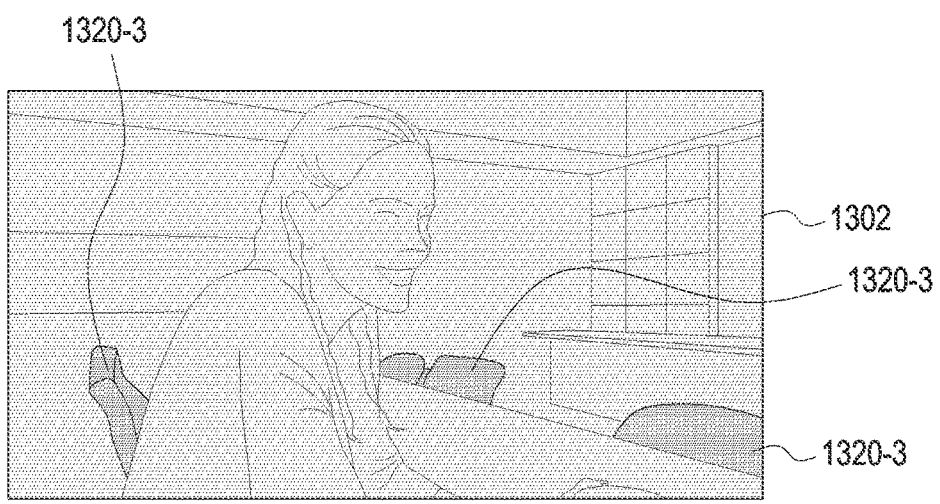

Referring to FIGS. 13D and 13E, a second object area 1320-2 (e.g., a person in the background) or a second object 1320-3 (e.g., a desk or a chair between persons in the foreground and the background) that is different from the second object area 1320-1 (e.g., a person in the foreground) is illustrated.

According to an embodiment of the disclosure, when the focus area 1300 is set as another area (e.g., the person in the background or the desk or chair between persons in the foreground and the background) that is different from the person in the foreground, the second object areas may be detected as the second object area 1320-2 (e.g., the person in the background) or the second object area 1320-3 (e.g., the desk or chair between the persons in the foreground and the background). For example, when the area corresponding to a point in the second object area 1320-2 of FIG. 13D is obtained as the focus area, the electronic device may obtain as the second object area 1320-2, an area in the second object area 1320-2, which corresponds to a pixel having a value that is similar to distance information. Likewise, when the area corresponding to a point in the second object area 1320-3 of FIG. 13E is obtained as the focus area, the electronic device may obtain as the second object area 1320-3, an area in the second object area 1320-3, which corresponds to a pixel having a value that is similar to distance information. The electronic device may apply a specific-type image effect (e.g., the out-focusing effect, the blurring effect, the bokeh effect, the color filtering effect, etc.) to the at least a part of the first input image 1301 based on the second object area 1320-1, 1320-2, or 1320-3 and display the image effect-applied image 1001.

Figure 14:
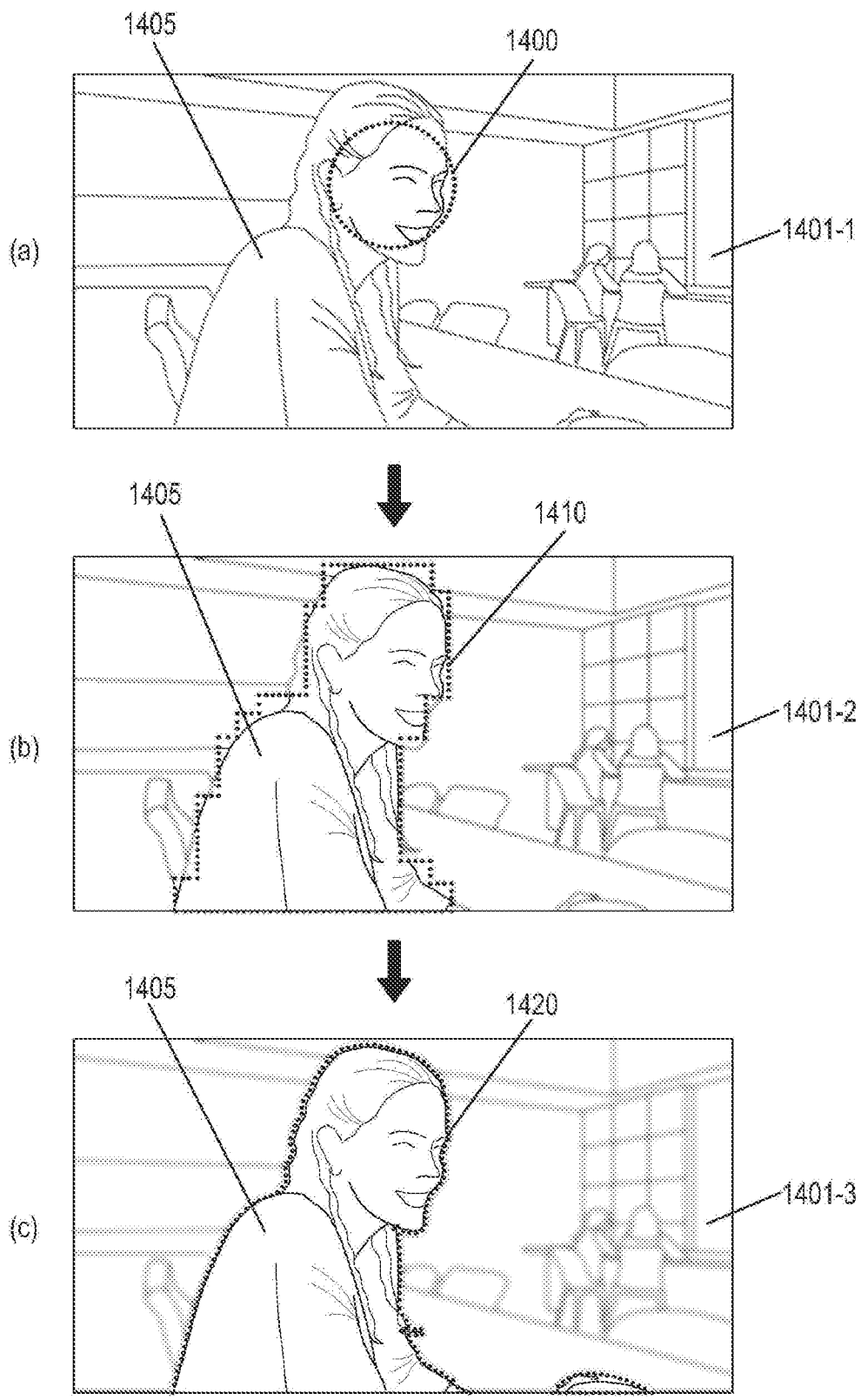
FIG. 14 illustrates an image displaying sequence based on a method for displaying an image in an electronic device, according to various embodiments of the disclosure.

FIG. 14 illustrates an image displaying sequence based on a method for displaying an image in an electronic device, according to various embodiments of the disclosure.

Referring to FIG. 14, FIG. 14(*a*) illustrates a picture 1401-1 in which a first image effect is applied based on a touch-based area 1400 of a first input image obtained from a first camera (e.g., the first camera 410), FIG. 14(*b*) illustrates a picture 1401-2 in which a second image effect is applied to at least a part of the first input image based on a first object area 1410 obtained using phase difference information of the first input image, and FIG. 14(*c*) illustrates a picture 1401-3 in which a third image effect is applied to at least a part of the first input image based on a second object area 1420 obtained using disparity information between the first input image and a second input image obtained from a second camera (e.g., the second camera 420). In FIG. 14, the first image effect is an image effect in which a first-type image effect is applied at a first level, the second image effect is an image effect in which the first-type image effect is applied at a second level that is higher than the first level, and the third image effect is an image effect in which the first-type image effect is applied at a third level that is higher than the second level, and the first-type image effect may be at least one of the out-focusing effect, the blurring effect, the bokeh effect, or the color filter effect that is set differently for each area.

Referring to FIGS. 14(*a*) through 14(*c*), from the picture 1401-1 of FIG. 14(*a*) to the picture 1401-3 of FIG. 14(*c*), a level (intensity) of the first-type image effect increases. For example, the first type is the blur effect or the bokeh effect, and from the picture 1401-1 to the picture 1401-3, the intensity (strength) of the blurring effect or the bokeh effect increases. The second object area 1402 obtained corresponding to an object 1405 by using the disparity information in FIG. 14(*c*) is more precise than the first object area 1410 obtained corresponding to the object 1405 by using the phase difference information in FIG. 14(*b*).

According to various embodiments of the disclosure, a method for displaying an image in an electronic device (e.g., the electronic device 401) includes applying a first image effect to at least a part of a first input image that is obtained from a first camera (e.g., the first camera 410) arranged on a first surface of a housing of the electronic device 401, based on a first object area for the first input image, the first object area being obtained using phase difference information of the first input image between the first input image and a second input image obtained from a second camera (e.g., the second camera 420) arranged spaced apart from the first camera 410 on the first surface, and displaying the first image effect-applied first input image, and applying a second image effect to at least a part of the first input image based on a second object area for the first input image, the second object area being obtained using disparity information between the first input image and the second input image, and displaying the second image effect-applied first input image.

According to various embodiments of the disclosure, the method may further include setting a focus area for the first input image upon input of a request for applying an image effect to the first input image.

According to an embodiment of the disclosure, the setting of the focus area may further include determining whether a touch input with respect to the first input image is received and setting a touch-based area obtained based on a touch point of the touch input as the focus area, when the touch input is received. According to an embodiment of the disclosure, the setting of the focus area may further include determining whether an auto recognition area corresponding to an auto recognition operation with respect to the first input image is obtained, when the touch input is not received, and setting the obtained auto recognition area as the focus area, when the auto recognition area is obtained. According to an embodiment of the disclosure, the setting of the focus area may include setting a designated area as the focus area when the auto recognition area is not obtained.

According to an embodiment of the disclosure, the applying of the first image effect to the at least a part of the first input image and the displaying of the first image effect-applied first input image may include determining whether the phase difference information is obtained using the first input image, generating a first depth map including first distance information corresponding to each pixel of the first input image based on the phase difference information, when the phase difference information is obtained, obtaining an object area corresponding to a focus area for the first input image by using the first depth map and setting the obtained object area as the first object area, generating a first image in which the first image effect is applied to the first input image based on the set first object area, and displaying the generated first image on a display.

According to an embodiment of the disclosure, the applying of the second image effect to the at least a part of the first input image and the displaying of the second image effect-applied first input image include determining whether the disparity information is obtained using the first input image and the second input image, while displaying the first image, generating a second depth map including second distance information corresponding to each pixel of the first input image based on the disparity information, when the disparity information is obtained, obtaining an object area corresponding to the focus area by using the second depth map and setting the obtained object area as the second object area, generating a second image in which the second image effect is applied to the first input image based on the set second object area, and displaying the generated second image on the display.

According to an embodiment of the disclosure, the method may further include obtaining a touch-based area of a preset size based on a touch point of the touch input, when the touch input with respect to the first input image is received before the first image is displayed, generating an image in which the image effect is applied to at least a part of the first input image based on the touch-based area, and displaying the generated image on the display. According to an embodiment of the disclosure, a level of the image effect may be changed according to an intensity, the number of times, or a time of the touch input.

According to an embodiment of the disclosure, the method may further include determining whether the phase difference information using the first input image is obtained, performing color quantization with respect to the first input image when the phase difference information is not obtained, generating a segmentation map based on the color-quantized image, obtaining an object area corresponding to a focus area for the first input image by using the segmentation map and setting the obtained object area as a third object area, generating a third image in which the first image effect is applied to the first input image based on the set third object area, and displaying the generated third image on the display of the electronic device.

At least a part of an apparatus (e.g., modules or functions thereof) or a method (e.g., operations) according to various embodiments may be implemented with instructions stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

The computer readable recording medium may include a hard disk, a floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RANI, flash memory, etc.), and so forth. Further, the program instructions may include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

According to various embodiments of the disclosure, a computer-readable recording medium has recorded thereon a program to be executed on a computer, the program including executable instructions that cause, when executed by a processor (e.g., the processor 460), the processor 460 to perform operations of applying a first image effect to at least a part of a first input image that is obtained from a first camera (e.g., the first camera 410) arranged on a first surface of a housing of an electronic device (e.g., the electronic device 401), based on a first object area for the first input image, the first object area being obtained using phase difference information of the first input image between the first input image and a second input image obtained from a second camera (e.g., the second camera 420) arranged spaced apart from the first camera 410 on the first surface, and displaying the first image effect-applied first input image, and applying a second image effect to at least a part of the first input image based on a second object area for the first input image, the second object area being obtained using disparity information between the first input image and the second input image, and displaying the second image effect-applied first input image.

According to various embodiments of the disclosure, the program may further include an executable instruction that causes the processor to perform an operation of setting a focus area for the first input image upon input of a request for applying an image effect to the first input image.

According to various embodiments of the disclosure, the program may further include executable instructions that cause the processor to perform, when performing the operation of setting the focus area, operations of determining whether a touch input with respect to the first input image is received and setting a touch-based area obtained based on a touch point of the touch input as the focus area, when the touch input is received. According to various embodiments of the disclosure, the program may further include executable instructions that cause the processor to perform, when performing the operation of setting the focus area, operations of determining whether an auto recognition area corresponding to an auto recognition operation with respect to the first input image is obtained, when the touch input is not received, and setting the obtained auto recognition area as the focus area, when the auto recognition area is obtained. According to various embodiments of the disclosure, the program may further include an executable instruction that causes the processor to perform, when performing the operation of setting the focus area, an operation of setting a designated area as the focus area when the auto recognition area is not obtained.

According to various embodiments of the disclosure, the program may further include executable instructions that cause the processor to perform, when performing the operations of applying the first image effect to the at least a part of the first input image and displaying the first image effect-applied first input image, operations of determining whether the phase difference information is obtained using the first input image, generating a first depth map including first distance information corresponding to each pixel of the first input image based on the phase difference information, when the phase difference information is obtained, obtaining an object area corresponding to a focus area for the first input image by using the first depth map and setting the obtained object area as the first object area, generating a first image in which the first image effect is applied to the first input image based on the set first object area, and displaying the generated first image on a display.

According to various embodiments of the disclosure, the program may further include executable instructions that cause the processor to perform, when performing the operations of applying the first image effect to the at least a part of the first input image and displaying the first image effect-applied first input image, operations of determining whether the disparity information is obtained using the first input image and the second input image, while displaying the first image, generating a second depth map including second distance information corresponding to each pixel of the first input image based on the disparity information, when the disparity information is obtained, obtaining an object area corresponding to the focus area by using the second depth map and setting the obtained object area as the second object area, generating a second image in which the second image effect is applied to the first input image based on the set second object area, and displaying the generated second image on the display.

According to various embodiments of the disclosure, the program may further include executable instructions that cause the processor to perform operations of obtaining a touch-based area of a preset size based on a touch point of the touch input, when the touch input with respect to the first input image is received before the first image is displayed, generating an image in which the image effect is applied to at least a part of the first input image based on the touch-based area, and displaying the generated image on the display. According to various embodiments of the disclosure, the program may further include an executable instruction that cause the processor to perform an operation of changing a level of the image effect according to an intensity, a number of times, or a time of the touch input.

According to various embodiments of the disclosure, the program may further include executable instructions that cause the processor to perform operations of determining whether the phase difference information using the first input image is obtained, performing color quantization with respect to the first input image when the phase difference information is not obtained, generating a segmentation map based on the color-quantized image, obtaining an object area corresponding to a focus area for the first input image by using the segmentation map and setting the obtained object area as a third object area, generating a third image in which the first image effect is applied to the first input image based on the set third object area, and displaying the generated third image on the display of the electronic device.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

What is claimed is:

1. A portable communication device comprising:
   memory;
   a first camera;
   a second camera;
   a display; and
   at least one processor configured to:
   obtain, via the first camera, a first image corresponding to one or more external objects,
   obtain, via the second camera, a second image corresponding to at least one of the one or more external objects,
   detect a first object area in the first image,
   display, via the display, the first image as a first image effect is applied thereto, the first image effect determined based at least in part on the first object area,
   determine a second object area in the first image based at least in part on depth information corresponding to the first image, the depth information obtained based at least in part on the first image and the second image, and
   store, in the memory, the first image as a second image effect is applied thereto, the second image effect determined based at least in part on the second object area,
   wherein each of the first object area and the second object area corresponds to a same face,
   wherein a precision of the second object area corresponding to the same face is higher than that of the first object area corresponding to the same face, and
   wherein a second level of the second image effect applied to the same face is higher than a first level of the first image effect applied to the same face.

2. The portable communication device of claim 1, wherein the at least one processor is further configured to:
   obtain the depth information using a disparity between the first image and the second image before the first image effect and the second image effect are applied to the first image and the second image, respectively.

3. The portable communication device of claim 1,
wherein the first image effect and the second image effect are of a same image effect type, and
wherein a strength or intensity of the second image effect corresponding to the second level is higher than a strength or intensity of the first image effect corresponding to the first level.

4. The portable communication device of claim 3,
wherein the same image effect type is a bokeh effect, and
wherein a strength or intensity of the bokeh effect corresponding to the second level is higher than a strength or intensity of the bokeh effect corresponding to the first level.

5. The portable communication device of claim 1, wherein the first image as the first image effect is applied thereto is displayed as a preview image in real time before the first image as the second image effect is applied thereto is stored in the memory.

6. A method for displaying an image in a portable communication device, the method comprising:
    obtaining, via a first camera of the portable communication device, a first image corresponding to one or more external objects;
    obtaining, via a second camera of the portable communication device, a second image corresponding to at least one of the one or more external objects;
    detecting a first object area in the first image;
    displaying, via a display of the portable communication device, the first image as a first image effect is applied thereto, the first image effect determined based at least in part on the first object area;
    determining a second object area in the first image based at least in part on depth information corresponding to the first image, the depth information obtained based at least in part on the first image and the second image; and
    storing, in a memory of the portable communication device, the first image as a second image effect is applied thereto, the second image effect determined based at least in part on the second object area,
wherein each of the first object area and the second object area corresponds to a same face,
wherein a precision of the second object area corresponding to the same face is higher than that of the first object area corresponding to the same face, and
wherein a second level of the second image effect applied to the same face is higher than a first level of the first image effect applied to the same face.

7. The method of claim 6, further comprising:
    obtaining the depth information using a disparity between the first image and the second image before the first image effect and the second image effect are applied to the first image and the second image, respectively.

8. The method of claim 6,
wherein the first image effect and the second image effect are of a same image effect type, and
wherein a strength or intensity of the second image effect corresponding to the second level is higher than a strength or intensity of the first image effect corresponding to the first level.

9. The method of claim 8,
wherein the same image effect type is a bokeh effect, and
wherein a strength or intensity of the bokeh effect corresponding to the second level is higher than a strength or intensity of the bokeh effect corresponding to the first level.

10. The method of claim 6, wherein the first image as the first image effect is applied thereto is displayed as a preview image in real time before the first image as the second image effect is applied thereto is stored in the memory.

* * * * *